US012300778B2

(12) United States Patent
Miyazaki et al.

(10) Patent No.: US 12,300,778 B2
(45) Date of Patent: May 13, 2025

(54) POSITIVE ELECTRODE ACTIVE MATERIAL, POSITIVE ELECTRODE, BATTERY, BATTERY PACK, ELECTRONIC DEVICE, ELECTRIC VEHICLE, POWER STORAGE DEVICE, AND POWER SYSTEM

(71) Applicant: MURATA MANUFACTURING CO., LTD., Kyoto (JP)

(72) Inventors: Takeshi Miyazaki, Kyoto (JP); Katsunori Takahara, Kyoto (JP); Yosuke Murakami, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 625 days.

(21) Appl. No.: 16/746,266

(22) Filed: Jan. 17, 2020

(65) Prior Publication Data
US 2020/0153035 A1    May 14, 2020

Related U.S. Application Data

(63) Continuation of application No. PCT/JP2018/026745, filed on Jul. 17, 2018.

(30) Foreign Application Priority Data

Jul. 18, 2017    (JP) .................................. 2017-139391

(51) Int. Cl.
H01M 10/0525    (2010.01)
H01M 4/02    (2006.01)
(Continued)

(52) U.S. Cl.
CPC ....... *H01M 10/0525* (2013.01); *H01M 4/131* (2013.01); *H01M 4/134* (2013.01);
(Continued)

(58) Field of Classification Search
CPC ...... H01M 4/131; H01M 4/134; H01M 4/366; H01M 4/382; H01M 4/525; H01M 10/0525; H01M 2004/027; H01M 2004/028
See application file for complete search history.

(56) References Cited

U.S. PATENT DOCUMENTS

2014/0247016 A1* 9/2014 Stottlemyer ........ H01M 10/446
429/231.95
2014/0356695 A1* 12/2014 Abe ....................... B60L 53/00
429/223
(Continued)

FOREIGN PATENT DOCUMENTS

CN    106537679    3/2017
JP    2004002141 A    1/2004
(Continued)

OTHER PUBLICATIONS

H. Moriwake et al., "First-Principles Calculations of Lithium-Ion Migration at a Coherent Grain Boundary in a Cathode Material, LiCoO2", Advanced Materials, vol. 25, pp. 618-622, 2013.
(Continued)

*Primary Examiner* — Armindo Carvalho, Jr.
(74) *Attorney, Agent, or Firm* — K&L Gates LLP

(57) ABSTRACT

A battery includes a positive electrode including powder of a positive electrode active material; a negative electrode; and an electrolyte. The powder of the positive electrode active material includes particles, which have a grain boundary and in which c axes of two regions sandwiching the grain boundary are in reflective symmetry, and the particles in the powder of the positive electrode active material have a content percentage of 50% or less.

19 Claims, 13 Drawing Sheets

(51) Int. Cl.
  *H01M 4/131* (2010.01)
  *H01M 4/134* (2010.01)
  *H01M 4/36* (2006.01)
  *H01M 4/38* (2006.01)
  *H01M 4/525* (2010.01)

(52) U.S. Cl.
  CPC ........... *H01M 4/366* (2013.01); *H01M 4/382* (2013.01); *H01M 4/525* (2013.01); *H01M 2004/027* (2013.01); *H01M 2004/028* (2013.01)

(56) References Cited

U.S. PATENT DOCUMENTS

| | | | |
|---|---|---|---|
| 2016/0380313 A1* | 12/2016 | Morita | H01M 10/486 429/50 |
| 2017/0125842 A1* | 5/2017 | Meguro | H01M 10/0585 |
| 2018/0083278 A1* | 3/2018 | Dai | H01M 4/1391 |

FOREIGN PATENT DOCUMENTS

| | | |
|---|---|---|
| JP | 4594605 B2 | 12/2010 |
| JP | 2012138335 A | 7/2012 |
| WO | 2017047729 A1 | 3/2017 |

OTHER PUBLICATIONS

International Search Report for Application No. PCT/JP2018/026745, dated Oct. 9, 2018.
Japanese Office Action issued Feb. 2, 2021 in corresponding Japanese Application No. 2019-531041.
Chinese Office Action issued Jul. 18, 2022 in corresponding Chinese Application No. 201880047000.3.
Hiroki Moriwake, et al., First-Principles Calculations of Lithium-Ion Migration at a Coherent Grain Boundary in a Cathode4 Material, LiCoO2, AdvMater. 2013, 25, 618-622.

* cited by examiner

POSITIVE ELECTRODE ACTIVE MATERIAL, POSITIVE ELECTRODE, BATTERY, BATTERY PACK, ELECTRONIC DEVICE, ELECTRIC VEHICLE, POWER STORAGE DEVICE, AND POWER SYSTEM

CROSS REFERENCE TO RELATED APPLICATIONS

The present application is a continuation of PCT patent application no. PCT/JP2018/026745, filed on Jul. 17, 2018, which claims priority to Japanese patent application no. JP2017-139391 filed on Jul. 18, 2017, the entire contents of which are being incorporated herein by reference.

BACKGROUND

The present disclosure generally relates to a positive electrode active material, a positive electrode, a battery, a battery pack, an electronic device, an electric vehicle, a power storage device, and a power system.

It has been studied to improve a battery by increasing its capacity and energy density by precisely determining a practical limit of a positive electrode active material that has been used conventionally, and expanding a working range almost up to the practical limit.

Incidentally, properties of a battery are largely affected by properties of the positive electrode active material, and therefore, various techniques have been studies regarding the positive electrode active material.

SUMMARY

The present disclosure generally relates to a positive electrode active material, a positive electrode, a battery, a battery pack, an electronic device, an electric vehicle, a power storage device, and a power system.

Lithium cobalt oxide would have such drawback that an undesirable reaction would possibly take place on an active material surface in contact with an electrolysis solution in charging and discharging in a high potential region as described above, thereby possibly deteriorating a charge and discharge cycle property (discharge capacity maintaining ratio).

An object of the present disclosure is to provide a positive electrode active material, a positive electrode, a battery, a battery pack, an electronic device, an electric vehicle, a power storage device, and a power system, each of which is capable of reducing such deterioration of the charge and discharge cycle property even if charging and discharging in the high potential region have occurred.

According to an embodiment of the present disclosure, a battery is provided. The battery includes a positive electrode including powder of a positive electrode active material; a negative electrode; and an electrolyte. The powder of the positive electrode active material includes particles. The particles have a grain boundary, and c axes of two regions sandwiching the grain boundary are in reflective symmetry, and the particles in the powder of the positive electrode active material have a content percentage of 50% or less.

A battery pack, an electronic device, an electric vehicle, a power storage device, and a power system of the present disclosure include the battery as described herein.

According to an embodiment of the present disclosure, a positive electrode active material includes positive electrode active material particles, which have a grain boundary and in which c axes of two regions sandwiching the grain boundary are in reflective symmetry, and the positive electrode active material particles in the positive electrode active material have by a content percentage of 50% or less.

A positive electrode of the present disclosure includes the positive electrode active material as described herein.

According to the present disclosure, it becomes possible to reduce deterioration of the charge and discharge cycle property even if charging and discharging in the high potential region have occurred. It should be noted that the advantageous effect described herein is not to limit the present invention, and the present invention may have only any one of advantageous effects described in the present disclosure, or may have an advantageous effect different from the advantageous effects described in the present disclosure.

DETAILED DESCRIPTION

As described herein, the present disclosure will be described based on examples with reference to the drawings, but the present disclosure is not to be considered limited to the examples, and various numerical values and materials in the examples are considered by way of example. Especially in a case of a positive electrode active material for high charging voltage (such as $LiCoO_2$), an undesirable reaction on an active material surface in contact with an electrolysis solution (such as acidolysis of the electrolysis solution, and transition metal elution) would proceed under high potential states, thereby deteriorating the cycle property and generating gas, which would possibly result in deterioration of battery reliability. Therefore, an increase in the active material surface during usage would possibly result in such deterioration of battery reliability.

$LiCoO_2$ is a material in a form of particles (primary particles or secondary particles), and therefore is such that, when c axes (crystal axes) of crystalline grains adjacent with each other at a grain boundary are in reflective symmetry, expansion or shrinkage of crystal lattice in charging or discharging would result in that expansion stress or shrinkage stress between the crystalline grains is concentrated at the grain boundary. This would cause structural destruction (cracking) whose center of cracking is at the grain boundary, thereby exposing a new exposed surface on the particles of the active material. The exposure of such an exposed surface increases the active material surface, thereby resulting in the deterioration of battery reliability.

Figure 1:
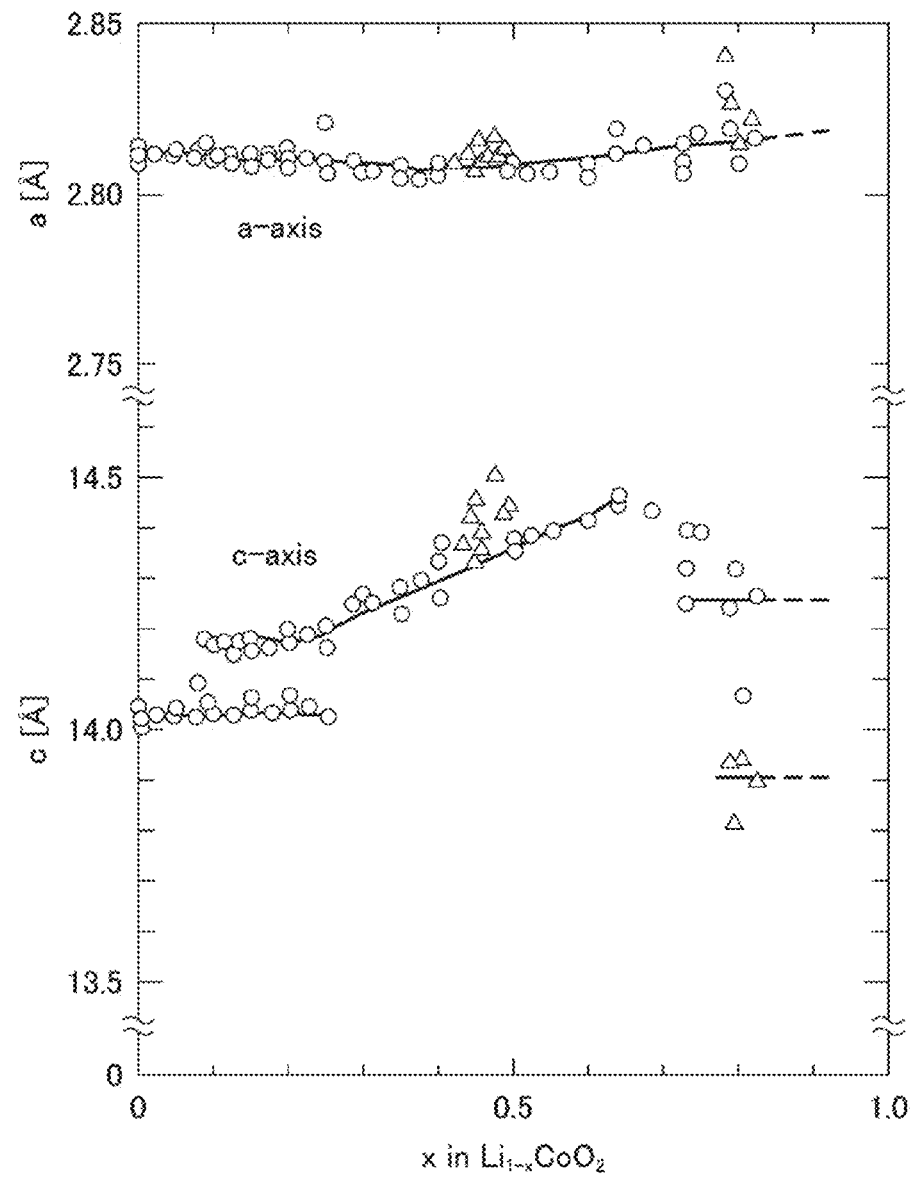
FIG. 1 is a graph illustrating behavior of a lattice constant change of $LiCoO_2$ according to an embodiment of the present disclosure.

In general, a crystalline positive electrode active material is a material in a form of particles, which include primary particles or secondary particles. Crystal axes of crystalline grains adjacent with each other within the primary particles or crystal axes of primary particles adjacent with each other within the secondary particles are rarely in such a relationship that the crystal axes are oriented in one direction, but are often in such a relationship that the crystal axes are randomly oriented. Furthermore, a lamellar rock salt-like material such as $LiCoO_2$ is associated with expansion and shrinkage of its lattice volume at the time of insertion and extraction of Li. As illustrated in FIG. 1 (adapted from T. Ohzuku and A. Ueda, J. Electrochem., Soc., Vol 141, pp 2972 (1994) "Solid-State Redox Reactions of $LiCoO_2$ (R–3m) for 4 Volt Secondary Lithium Cells"), a structural anisotropy, which is characteristic of such a lamellar structure, causes an anisotropy also in directions of the expansion and shrinkage. Therefore, the directions of the expansion and shrinkage of crystalline grains adjacent with each other within the primary particles or the direction of the expansion and shrinkage of primary particles adjacent with each other within the secondary particles are determined according to the relationship between the orientations of the crystal axes, and, therefore, are rarely orientated in one direction within the primary particles or the secondary particles.

Observation of the positive electrode active material after charging and discharging, especially after charging and discharging in a high potential region, finds that some population of the particles thereof is cracked. It is considered that the anisotropic expansion and shrinkage of the active material as described above is one of causes for the cracking of the particles. A concrete cracking mechanism deduced is that, in two regions sandwiching the grain boundary in the primary particles or the secondary particles, if the relationship between the orientations of the crystal axes is such that the orientations are different, the directions of the expansion and shrinkages will be different, thereby causing concentration of stress at the grain boundary portion, as a result of which cracking occurs from the grain boundary as the center of cracking. Because the increase in the active material surface causes deactivation of the active material or swelling of the battery and consequently results in deterioration of the battery reliability, it is not preferable that a new surface is exposed as a result of such cracking of the active material particles.

Therefore, in the present disclosure, a positive electrode active material is configured to include, by content percentage of 50% or less, such positive electrode active material particles that have grain boundaries and that c axes (crystal axes) of two regions sandwiching each grain boundary are in reflective symmetry. With this configuration, it becomes possible to reduce a content amount of such positive electrode active material particles that would be cracked if charging and discharging in the high potential region take place. Therefore, it becomes possible to reduce deterioration of the charge and discharge cycle property and to reduce gas generation.

A positive electrode active material according to a first exemplary embodiment of the present disclosure is a positive electrode active material suitable for a non-aqueous electrolyte secondary battery for high charging voltage.

Examples of such a non-aqueous electrolyte secondary battery includes, but not limited to, a lithium ion secondary battery, a lithium ion polymer secondary battery, and the like.

Figure 2A:
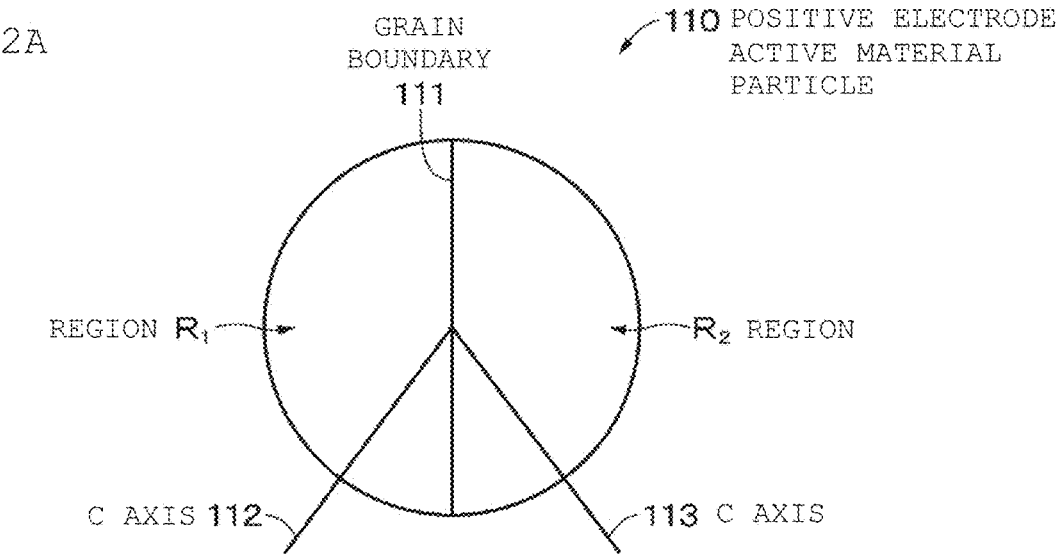
FIG. 2A is a cross-sectional view of one example of a configuration of a positive electrode active material particle according to an embodiment of the present disclosure.

The positive electrode active material is in a powder form. The positive electrode active material includes such positive electrode active material particles 110 that has, as illustrated in FIG. 2A, a grain boundary 111, and that two regions $R_1$ and $R_2$ sandwich the grain boundary 111 therebetween and C axes (crystal axes) 112 and 113 of the two regions $R_1$ and $R_2$ are in reflective symmetry (hereinafter, such positive electrode active material particles are referred to as "reflective symmetry particles"). A content percentage of the reflective symmetry particles 110 in the positive electrode active material is 50% or less, preferably 40% or less, more preferably 25% or less, further preferably 15% or less, or especially preferably 10% or less. When the content percentage is 50% or less, it becomes possible to reduce the number of reflective symmetry particles 110 in which cracking would occur in the regions $R_1$ and $R_2$ from the grain boundary 111 as the center of cracking, thereby making it possible to down-regulate the increase of the positive electrode active material surface. Therefore, it becomes possible to reduce deterioration of the charge and discharge cycle property and to reduce gas generation. It should be noted that two or more grain boundaries 111 may be present, while the drawings are simplified not to illustrate them.

The content percentage is worked out as below. To begin with, a battery is prepared with a positive electrode active material, and repeatedly subjected to the charging and discharging in the high potential region. After that, the battery is disassembled to take out its positive electrode. After the positive electrode is washed with dimethyl carbonate or the like, the positive electrode is chopped, thereby preparing a sample piece. Then, the sample piece is observed with a cross-sectional scanning electron microscope (SEM), thereby obtaining a cross-sectional SEM image. In the cross-sectional SEM image thus obtained, the number N of positive electrode active material particles of 1 μm or greater in particle diameter (maximum feret diameter) are counted. Furthermore, the number n of reflective symmetry particles 110 in the positive electrode active material particles of 1 μm or greater in particle diameter thus counted are counted. This procedure is repeated until the number N of the particles of 1 μm or greater in particle diameter reaches 100 or more. Finally, a content percentage R [%] of the reflective symmetry particles 110 in the positive electrode active material is worked out, where the content percentage R [%] of the reflective symmetry particles 110=(the number n of reflective symmetry particles/the number N of the particles of 1 μm or greater in particle diameter)×100).

In the method of working out the content amount, the determination as to whether or not a positive electrode active material particle is a reflective symmetry particle 110 is carried out by determining whether or not there is predetermined leaf-vein-shaped cracking. That is, if a particle has the predetermined leaf-vein-shaped cracking on a cross section thereof, the positive electrode active material particle is determined as a reflective symmetry particle 110, and if the particle does not have the predetermined leaf-vein-shaped cracking on the cross section thereof, the positive electrode active material particle is determined as not a reflective symmetry particle 110.

Figure 2B:
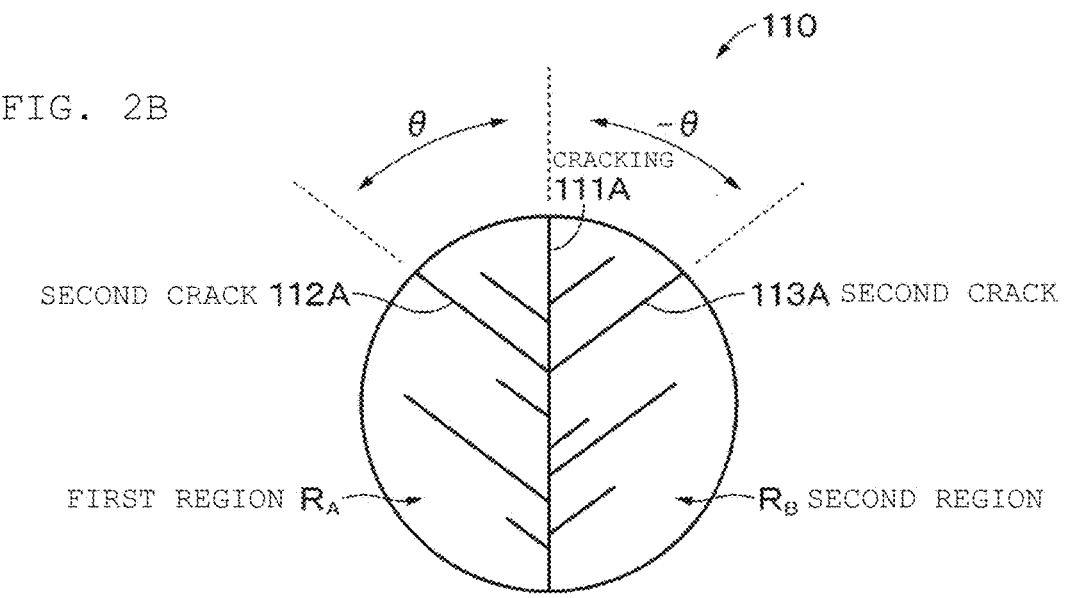
FIG. 2B is a schematic diagram illustrating one example of leaf-vein-shaped cracking of the positive electrode active material particle according to an embodiment of the present disclosure.

Here, the "leaf-vein-shaped cracking" is, as illustrated in FIG. 2B, such cracking that includes a linear crack 111A separating the cross section of the particle into the first and second regions $R_A$ and $R_B$ (hereinafter, this crack is referred to as "center crack"), a linear first crack 111A formed in the first region $R_A$ and making an angle $\theta_1$ ($0<\theta_1<90°$) with respect to the center crack 111A, and a linear second crack 111B formed in the second region $R_B$ and making an angle $-\theta_2$ ($-90°<-\theta_2<0$) with respect to the center crack 111A. Here, if the cracking has at least one first crack 112A and at least one second crack 113A, the cracking is referred to as "leaf-vein-shaped cracking". Note that the center crack 111A corresponds to the grain boundary 111, and the first and second regions $R_A$ and $R_B$ correspond to the two regions $R_1$ and $R_2$ sandwiching the grain boundary, respectively.

Moreover, the "predetermined leaf-vein-shaped cracking" is, among the leaf-vein-shaped cracking, such cracking that an absolute value of the difference between the angles $\theta_1$ and $\theta_2$, $|\theta_1-\theta_2|$, is 30° or less. The absolute value $|\theta_1-\theta_2|$ is set as 30° or less in consideration of a spatial twisting relationship between each layer of two crystalline grains forming the grain boundary 111, a cut surface of the sample piece, and the spatial twisting relationship between each layer of two crystalline grains forming the grain boundary 111.

Figure 3A:
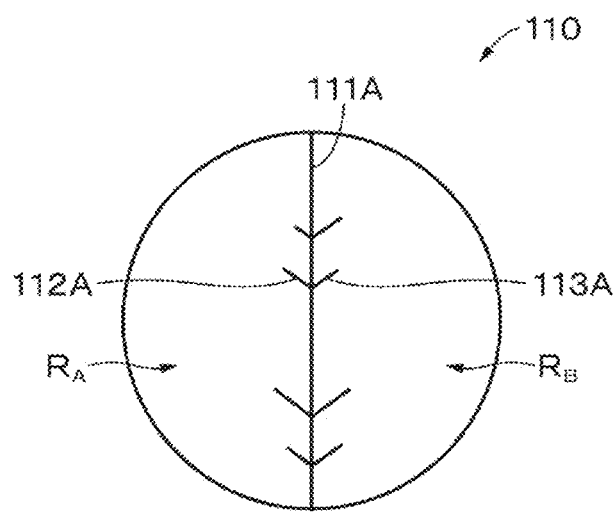
FIGS. 3A, 3B, and 3C are schematic diagrams each illustrating one example of proceeding of the leaf-vein-shaped cracking proceeding in association with an increase in charge and discharge cycles according to an embodiment of the present disclosure.
Figure 3B:
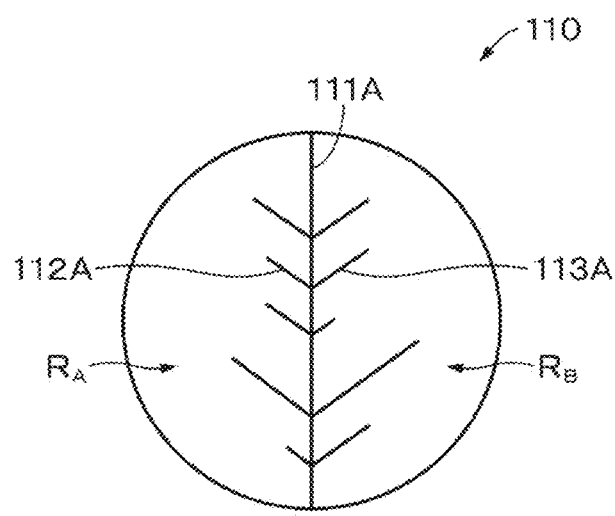
Figure 3C:
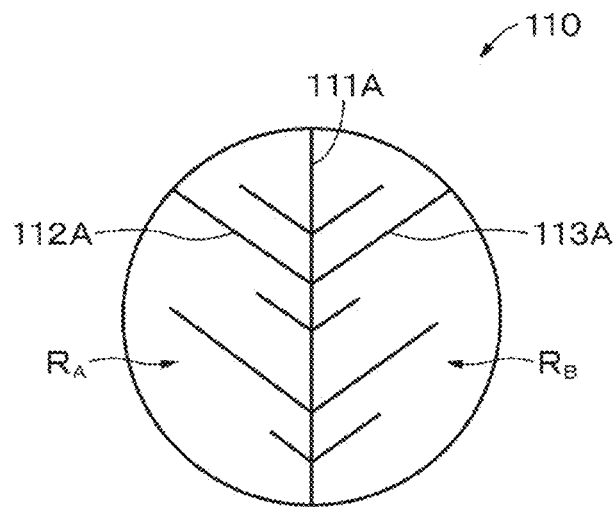

The leaf-vein-shaped cracking proceeds, for example, in the order of FIGS. 3A, 3B, and 3C as the number of charging and discharging cycles increases. More specifically, as the number of charge and discharge cycles increases, the number of the first and second cracks 112A and 113A increases and lengths of the first and second cracks 112A and 113A become longer.

Therefore, as the charge and discharge cycles are repeated more, the leaf-vein-shaped shape becomes more apparent.

Figure 4A:
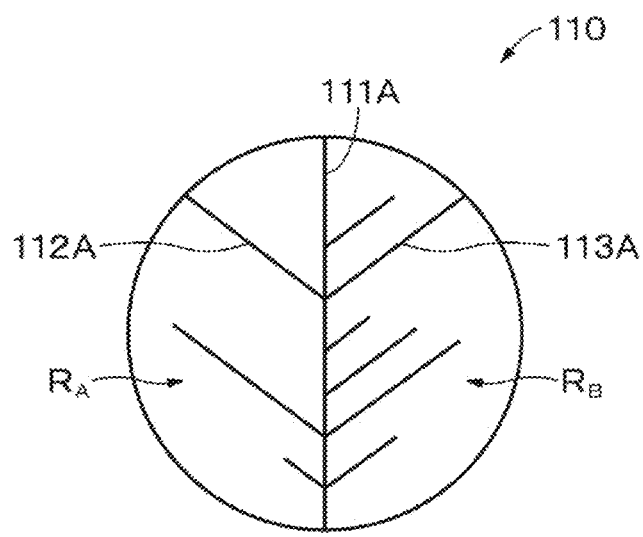
FIGS. 4A and 4B are schematic diagrams each illustrating another example of the leaf-vein-shaped cracking of the positive electrode active material particle according to an embodiment of the present disclosure.
Figure 4B:
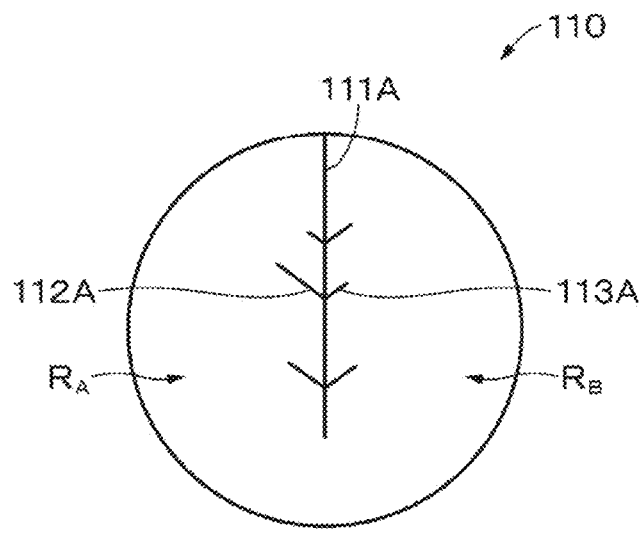

The center crack 111A and the first and second cracks 112A and 113A constituting the leaf-vein-shaped cracking may be as below. (a) The first and second cracks 112A and 113A may extend into the first and second regions $R_A$ and $R_B$ from different points on the center crack 111A, respectively, as illustrated in FIG. 2B, or may extend into the first and second regions $R_A$ and $R_B$ from the same point on the center crack 111A, respectively, as illustrated in FIG. 3C. (b) The number of the first cracks 112A formed in the first region $R_A$ and the number of the second cracks 113A formed in the second region $R_B$ may be the same as illustrated in FIGS. 2B and 3C, or may be different from each other as illustrated in FIG. 4A. (c) The center crack 111A may extend across the whole cross-section of the particle as illustrated in FIG. 2B, or may extend not across the whole cross-section of the particle as illustrated in FIG. 4B. If the center crack 111A extends not across the whole cross-section of the particle, one end of the center crack 111A may or may not be in contact with an outline of the cross section of the particle. (d) If there are a plurality of first cracks 112A in the first region $R_A$, these first cracks 112A may have different lengths. Similarly, if there are a plurality of second cracks 113A in the second region $R_B$, these second cracks 113A may have different lengths. (e) The first and second cracks 112A and 113A may have the same length or different lengths. (f) The center crack 111A and the first and second cracks 112A and 113A may be straight or curved.

Figure 5:
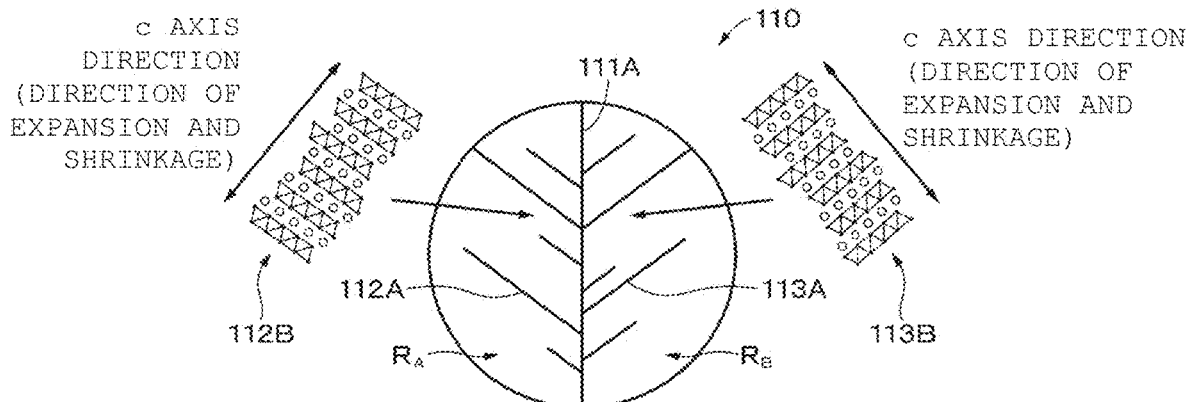
FIG. 5 is a schematic diagram illustrating a result of crystal orientation analysis of a positive electrode active material particle in which leaf-vein-shaped cracking is occurred according to an embodiment of the present disclosure.

The cause of the leaf-vein-shaped cracking is explained as below. Crystal orientation analysis results by electron backscatter diffraction (EBSD) show that each of the first and second cracks 112A and 113A is a crack occurred due to cleavage along layers 112B and 113B in a lamellar rock salt-like structure, as illustrated in FIG. 5. Therefore, the center crack 111A is a crack formed along the grain boundary 111 at which different crystalline grains adjoin with each other. That is, a particle in which such leaf-vein-shaped cracking would occur is, a reflective symmetry particle 110 in which two crystalline grains adjoin with each other to form a V-shaped lamellar structure, so that c axes 112 and 113 have a reflective symmetry relation with respect to the grain boundary 111 serving as a plane of symmetry, as illustrated in FIG. 2A. Therefore, charging and discharging of the reflective symmetry particle 110 will cause swelling and shrinking of the c axes 112 and 113 in association with the charging and discharging, whereby the stress from the two crystalline grains concentrate on the grain boundary 111, which results in cracking at the grain boundary portion and lamellar cleavage.

Even though the method of determining whether or not the positive electrode active material particle is a reflective symmetry particle 110, based whether or not the predetermined leaf-vein-shaped cracking occurs on the cross section of the particle has been explained herein, the determining is not limited to this method, any method that can determine the relationship between the directions of the c axes 112 and 113 and the grain boundary can be adopted.

An average particle diameter of the positive electrode active material particles is preferably not less than 2 μm but not more than 50 μm, or more preferably not less than 5 μm but not more than 40 μm. If the average particle diameter was less than 2 μm, the positive electrode active material would be easy to come off from a positive electrode collector in a pressing process in a positive electrode production, and moreover, a surface area of the positive electrode active material would be larger, thereby requiring a greater amount of a conducting agent, a binding agent, or the like, which would lower energy density per unit mass. On the other hand, if the average particle diameter exceeded 50 μm, this would increase a possibility that the positive electrode active material would penetrate through a separator, thereby causing short circuiting.

The average particle diameter of the positive electrode active material particles is worked out as below. To begin with, a positive electrode compound is prepared by mixing the positive electrode active material and a binding agent, and the positive electrode compound is dispersed in a solvent such as N-methyl-2-pyrolidone (NMP), thereby preparing a positive electrode compound slurry in a paste form. Next, the positive electrode compound slurry is applied on a positive electrode collector and the solvent is dried off, thereby forming a positive electrode active material layer. In this way, a positive electrode is prepared. Next, the positive electrode is chopped, thereby obtaining a sample piece. The sample piece is observed with the cross-sectional SEM observation. From an SEM image thus captured, ten particles are selected randomly, and areas of the cross sections of the particles are measured by image processing, and particle diameters (dimeters) of the particles are worked out on the assumption that the cross sections of the particles are circular. Finally, the particle diameters of the ten particles thus measured are simply averaged (arithmetically averaged) to work out an average particle diameter, which is taken as the average particle diameter of the positive electrode active material particles.

The positive electrode active material according to the first exemplary embodiment is applicable to a high charging voltage-type battery whose positive electrode potential (vsLi/Li$^+$) in the full charge state is preferably 4.40 V or greater, more preferably 4.45 V or greater, or further preferably 4.50 V or greater. This is because the use of the positive electrode active material according to the first exemplary embodiment in a battery for 4.40 V or greater can more significantly achieve the effects of reducing the deterioration of the charge and discharge cycle property and of reducing the gas generation. As for a battery using a positive electrode active material according to the first exemplary embodiment, an upper limit of the positive electrode potential (vsLi/Li$^+$) in the full charge state is not particularly limited, but is preferably 6.00 V or less, more preferably 5.00 V or less, further preferably 4.80 V or less, or especially preferably 4.70 V or less.

The positive electrode active material is a Li transition metal composite oxide, which is capable of absorbing and retaining, an electrode reaction material, that is, Li therein and leasing Li therefrom, and which has a lamellar rock-salt like structure. The positive electrode active material particles, for example, may be primary particles, which are substantially constituted with a sole crystalline grain, or may be primary particles which are constituted with a plurality of crystalline grains adjoining with each other. As an alternative, the positive electrode active material particles may be secondary particles constituted with such primary particles aggregated.

The Li transition metal composite oxide is at least one selected from the group consisting of lithium cobalt oxide and lithium metal oxides, in which the metal is a metal element other than cobalt. In this case, the content amount of the other metal element(s) in the Li transition metal composite oxide is, for example, smaller than a content amount of cobalt. The other metal element is at least one selected from the group consisting of Nickel (Ni), manganese (Mn), magnesium (Mg), aluminum (Al), boron (B), titanium (Ti), vanadium (V), chrome (Cr), iron (Fe), copper (Cu), zinc (Zn), molybdenum (Mo), tin (Sn), calcium (Ca), strontium (Sr), and tungsten (W).

It is preferable that the Li transition metal composite oxide have an average composition represented by the following Formula (1):

(1)

where M is at least one selected from the group consisting of nickel, manganese, magnesium, aluminum, boron, titanium, vanadium, chrome, iron, copper, zinc, molybdenum, tin, calcium, strontium, and tungsten, or preferably, at least one selected from the group consisting of aluminum, magnesium, and titanium, and r, s, t, and u are values within such ranges that $0.8 \leq r \leq 1.2$, $0 \leq s < 0.5$, $-0.1 \leq t \leq 0.2$, and $0 \leq u \leq 0.1$.

It should be noted that lithium content in the composition would be different depending on charge and discharge states, and the value of r indicates a value in a full discharge state.

The positive electrode active material according to the first exemplary embodiment is configured to include, by a content amount of 50% or less, the reflective symmetry particles 110, which have a grain boundary 111 and c axes (crystal axes) 112 and 113 of two regions $R_1$ and $R_2$ sandwiching the grain boundary 111 therebetween are in reflective symmetry. With the configuration, it becomes possible to reduce the content amount of the reflective symmetry particles 110 that would be cracked in the leaf-vein shape when the swelling and shrinkage of the positive electrode active material take place in association with the charging and discharging. By producing a battery with such a positive electrode active material, it becomes possible to reduce the deterioration of the charge and discharge cycle property and to reduce the gas generation even when the battery is charged and discharged with a high charging voltage for the sake of a higher capacity and a higher energy density of the battery. Therefore, it becomes possible to attain a battery, which shows an excellent reliability while having a higher capacity and a higher energy density. Furthermore, in case of a laminate film type battery, it becomes possible to reduce battery swelling that would be caused due to the gas generation.

A second exemplary embodiment will explain a non-aqueous electrolyte secondary battery including a positive electrode including the positive electrode active material according to the first exemplary embodiment.

Figure 6:
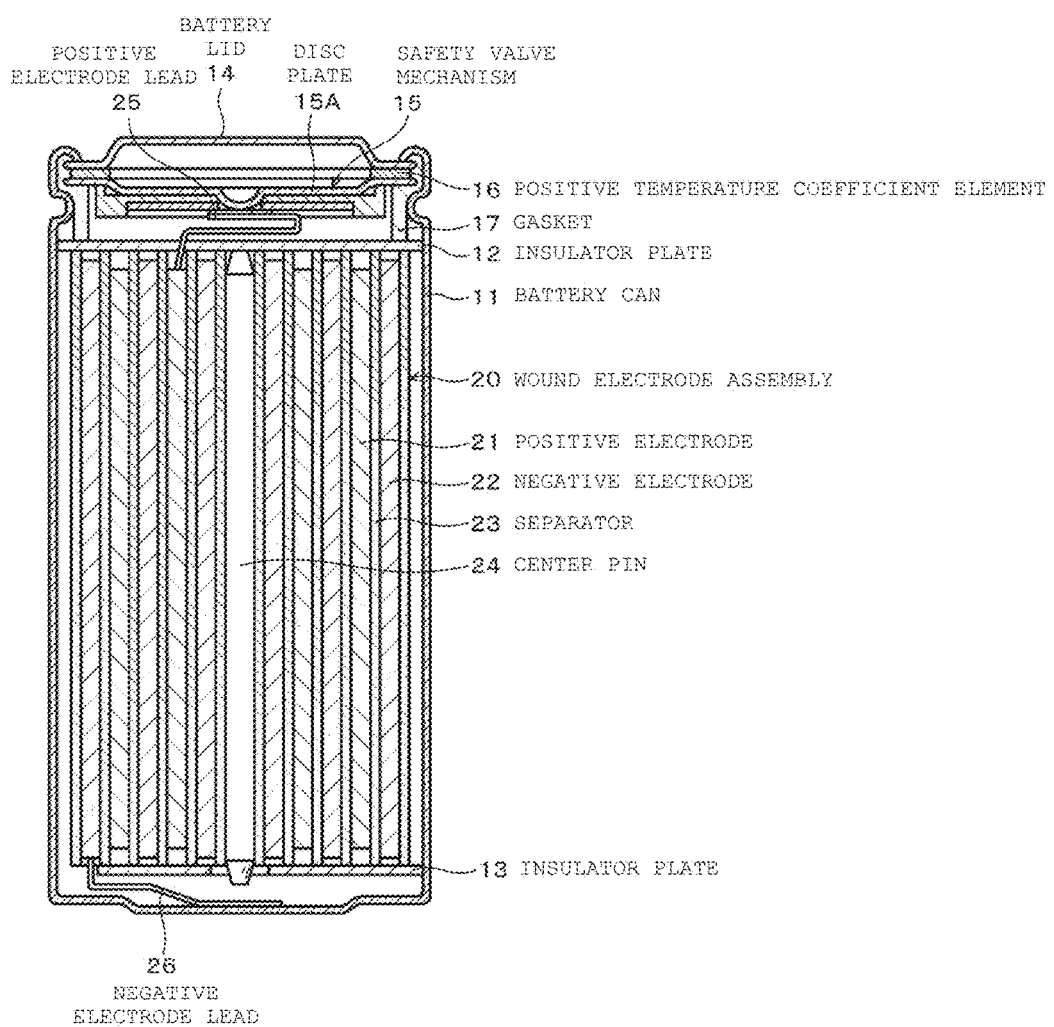
FIG. 6 is a cross-sectional view showing an example of a configuration of a non-aqueous electrolyte secondary battery according to an embodiment of the present disclosure.

Hereinafter, a configuration example of a non-aqueous electrolyte secondary battery (hereinafter, simply referred to as "battery") according to a second exemplary embodiment of the present technology will be described with reference to FIG. 6. The battery is a so-called lithium ion secondary battery, for example, for which the capacity of its negative electrode is represented by a capacity component based on intercalation and deintercalation of lithium (Li) which is an electrode reaction substance. The battery is of a so-called cylinder type and has, inside a battery can 11 which is hollow and substantially columnar, a wound electrode assembly 20 obtained by winding a pair of a belt-shaped positive electrode 21 and a belt-shaped negative electrode 22 which are layered to interpose a separator 23. The battery can 11 is configured of iron plated with nickel, one end part thereof is closed and the other end part is opened. The electrolysis solution is injected into the battery can 11 as an electrolysis solution in a liquid form, and is impregnated into the positive electrode 21, the negative electrode 22 and the separator 23. Moreover, a pair of insulator plates 12 and 13 are disposed perpendicular to the circumferential surface of winding to interpose the wound electrode assembly 20.

To the opening end part of the battery can 11, a battery lid 14, a safety valve mechanism 15 provided in the battery lid 14, and a positive temperature coefficient (PTC) element 16 are attached by crimping via an opening sealing gasket 17. Thereby, the inside of the battery can 11 is sealed. The battery lid 14 is configured, for example, of a material similar to that of the battery can 11. The safety valve mechanism 15 is electrically connected to the battery lid 14 and on the occasion that the inner pressure of the battery is not less than a certain value due to internal short, heating from the outside or the like, a disc plate 15A is configured to reverse so as to cut the electric connection between the battery lid 14 and the wound electrode assembly 20. The opening sealing gasket 17 is configured, for example, of insulative material and its surface is applied with asphalt.

Through the center of the wound electrode assembly 20, for example, a center pin 24 is inserted. A positive electrode lead 25 made of aluminum or the like is connected to a positive electrode 21 of the wound electrode assembly 20, and a negative electrode lead 26 made of nickel or the like is connected to a negative electrode 22. The positive electrode lead 25 is welded to the safety valve mechanism 15 to be electrically connected to the battery lid 14, and the negative electrode lead 26 is welded to the battery can 11 to be electrically connected thereto.

Figure 7:
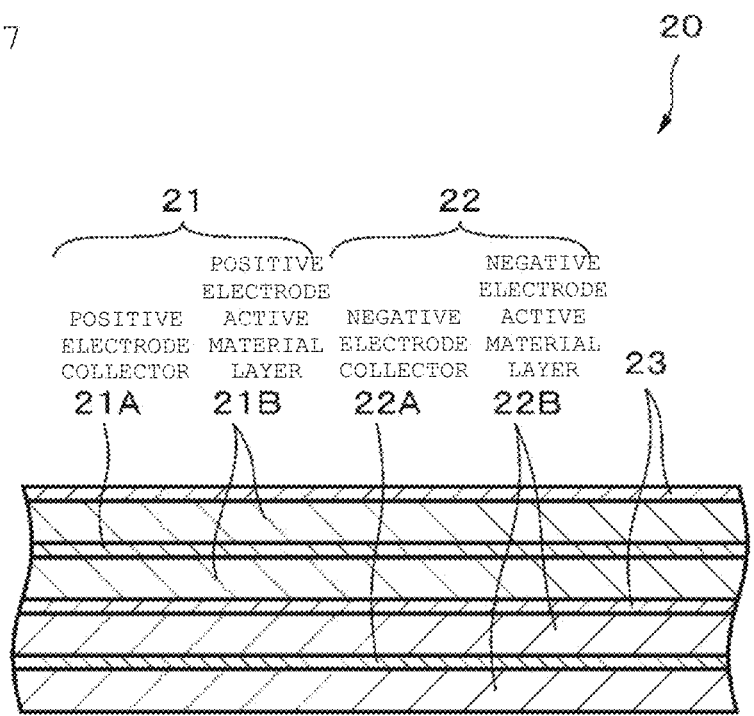
FIG. 7 is a cross-sectional view showing an enlarged part of a wound electrode assembly shown in FIG. 6.

The positive electrode 21, the negative electrode 22, the separator 23, and the electrolysis solution of the battery will be sequentially described below with reference to FIG. 7.

The positive electrode 21 has, for example, a structure in which a positive electrode active material layer 21B is provided on both sides of a positive electrode collector 21A. The positive electrode collector 21A is made of metal foil, for example, aluminum foil, nickel foil, or stainless steel foil. The positive electrode active material layer 21B includes a positive electrode active material. The positive electrode active material layer 21B may further include at least one of a conducting agent and a binding agent as necessary.

The positive electrode active material is the positive electrode active material according to the first embodiment.

As the binding agent, at least one selected from among, for example, resin materials such as polyvinylidene fluoride (PVdF), polytetrafluoroethylene (PTFE), polyacrylonitrile (PAN), styrene butadiene rubber (SBR), and carboxymethylcellulose (CMC), and a copolymer including such a resin material as a main component is used.

As the conducting agent, for example, a carbon material such as graphite, carbon fiber, carbon black, Ketjen black, or carbon nanotube is used, one kind of them may be used solely and two or more kinds of them may be mixed to be used. In addition, any metal material or conductive polymer material that is a material having conductivity may be used in addition to the carbon material.

The negative electrode 22 has, for example, a structure in which negative electrode active material layers 22B are provided on the both sides of a negative positive electrode collector 22A. The negative positive electrode collector 22A is made of metal foil, for example, copper foil, nickel foil or stainless steel foil.

The negative electrode active material layer 22B includes one or two or more negative electrode active material(s) capable of absorbing and retaining Li therein, and releasing Li therefrom. The negative electrode active material layer 22B may further include at least one of a binding agent or a conducting agent, as needed.

For this battery, it is preferable that the negative electrode 22 or the negative electrode active material be configured to have an electrochemical equivalent greater than that of the positive electrode 21, so that theoretically lithium metal precipitation on the negative electrode 22 will not occur during the charging.

Examples of the negative electrode active material includes, for example, carbon materials such as hardly graphitizable carbon, easily graphitizable carbon, graphite, thermally degraded carbons, cokes, glassy carbons, fired bodies of organic polymers, carbon fiber and activated carbon. Among these, the cokes include pitch cokes, needle cokes, petroleum cokes and the like. The fired bodies of organic polymers are carbons obtained by firing polymer materials such as phenol resin and furan resin at an appropriate temperature, and some of these are categorized as hardly graphitizable carbon or easily graphitizable carbon. These carbon materials are preferable for which change in crystal structure arising in charging or discharging is exceedingly small and which can attain high charge/discharge capacity and favorable cycle characteristics. Particularly, graphite is preferable which has a large electrochemical equivalent and can attain high energy density. Moreover, hardly graphitizable carbon is preferable which can attain excellent cycle characteristics. Furthermore, one which is low in charge/discharge potential, specifically, close to lithium metal in charge/discharge potential is preferable since it can easily realize high energy density of the battery.

As the negative electrode active material capable of high capacity, a material includes at least one of a metal element and a metalloid element as a constituent element (for example, an alloy, a compound or a mixture) is used. This is because a high energy density can be obtained with use of such a material. Such a material is preferably used together with carbon material because the high energy density and also excellent cycling characteristics can be obtained. Note that in the present disclosure, the alloy includes a material formed with two or more kinds of metal elements and a material containing one or more kinds of metal elements and one or more kinds of semi-metal elements. Further, the alloy may contain a non-metal element. Examples of its texture include a solid solution, a eutectic (eutectic mixture), an intermetallic compound, and one in which two or more kinds thereof coexist.

Examples of such a negative electrode active material include, for example, the metal element or semi-metal element capable of forming an alloy with lithium. Specifically, examples include magnesium, boron, aluminum, titanium, gallium (Ga), indium (In), silicon (Si), germanium (Ge), tin (Sn), lead (Pb), bismuth (Bi), cadmium (Cd), silver (Ag), zinc, hafnium (Hf), zirconium (Zr), yttrium (Y), palladium (Pd), and platinum (Pt). These materials may be crystalline or amorphous.

The negative electrode active material preferably contains a metal element of Group 4B in the short period periodic table or a metalloid element as a constituent element, or more preferably at least one of silicon or tin as a constituent element. Silicon and tin can provide a great capability of absorbing and retaining Li therein and releasing Li therefrom, thereby making it possible to attain a higher energy density. Examples of such negative electrode active material include materials including, at least in part thereof, an elementary substance, an alloy, or a compound of silicon, an elementary substance, an alloy, or a compound of tin, or one or two or more phases of them.

Examples of the alloy of silicon include alloys containing, as a second constituent element other than silicon, at least one selected from the group consisting of tin, nickel, copper, iron, cobalt, manganese, zinc, indium, silver, titanium, germanium, bismuth, antimony (Sb), and chromium. Examples of the alloy of tin include alloys containing, as a second constituent element other than tin, at least one selected from the group consisting of silicon, nickel, copper, iron, cobalt, manganese, zinc, indium, silver, titanium, germanium, bismuth, antimony, and chromium.

Examples of the compound of tin or the compound of silicon include compounds containing oxygen or carbon, which may contain any of the above-described second constituent elements in addition to tin or silicon.

Among them, as a Sn-type negative electrode active material, such a SnCoC-containing material is preferable that contains cobalt, tin, and carbon as constituent elements in such a way that a content amount of carbon is not more than 9.9% by mass but less than 29.7% by mass, and a ratio of cobalt with respect to a sum of tin and cobalt is not less than 30% by mass but not more than 70% by mass, because, within such composition ranges, it is possible to attain a high energy density and an excellent cycle property. That is the high energy density and also excellent cycling characteristics can be obtained in such composition range.

The SnCoC-containing material may contain the other constituent element(s), as needed. For example, the other constituent element may be preferably silicon, iron, nickel, chrome, indium, niobium, germanium, titanium, molybdenum, aluminum, phosphorous (P), gallium, or bismuth, and may be two or more elements. It is because the capacity or the cycle property can be further improved.

The SnCoC-containing material has a phase including tin, cobalt, and carbon, and it is preferable that this phase have a structure with low crystallinity or an amorphous structure. Moreover, in this SnCoC-containing material, it is preferable that at least part of carbon as the constituent element is bonded with a metal element or a metalloid element as a constituent element other than that. It is deduced that the deterioration of the cycle property is caused due to aggregation or crystallization of tin or the like. However, the bonding between carbon and the element other than carbon makes it possible to down-regulate such aggregation or crystallization.

Examples of a method of determining such a bonding state of elements include an X-ray photoelectron spectroscopy (XPS). In the XPS, a peak of carbon's 1s orbit (C1s) appears at 284.5 eV in the case of graphite in a device with energy calibration that calibrates a peak of gold atom's 4f orbit (Au4f) to 84.0 eV. Moreover, in the case of surface-contaminating carbon, it appears at 284.8 eV. On the other hand, in the case where the carbon element has a high charge density such as a case where carbon is bonded with a metal element or a metalloid element, the peak of C1s appears in a region lower than 284.5 eV. That is, when a peak of a composite wave of C1s obtained in the SnCoC-containing material appears in the region lower than 284.5 eV, it means that at least part of the carbon contained in the SnCoC-containing material is bonded with a metal element or a metalloid element as a constituent element other than carbon.

In the XPS measurement, for example, the peak of C1s is used for the calibration of the energy axis of the spectrometry. In general, surface-contaminating carbon is present on the surface, therefore the peak of C 1s of the surface-contaminating carbon is set to 284.8 eV and this value is set as the energy reference. In the XPS measurement, the waveform of the peak of C1s is obtained as a composite of the peak of the surface-contaminating carbon and the peak of carbon in the SnCoC-containing material. Thus, for example, by analysis with commercially available software, the surface-contaminating carbon and the peak of carbon in the SnCoC-containing material are separated from each other. In the analysis of the waveform, the position of a main peak present on a lowest binding energy side is considered as the energy reference (284.8 ev).

The other examples of the negative electrode active material include metal oxides, polymer compounds, or the like capable of absorbing and retaining Li therein and releasing Li. Examples of such metal oxides include lithium titanium oxide containing titanium and Lithium such as such as lithium titanate ($Li_4Ti_5O_{12}$), iron oxides, ruthenium oxides, molybdenum oxide, and the like. Examples of such polymer compounds include polyacetylene, polyaniline, polypyrrole, and the like.

As the binding agent, at least one selected from among, for example, resin materials such as polyvinylidene fluoride, polytetrafluoroethylene, polyacrylonitrile, styrene butadiene rubber, and carboxymethylcellulose, and a copolymer including such a resin material as a main component is used.

As the conducting agent, for example, a carbon material such as graphite, carbon fiber, carbon black, Ketjen black, or carbon nanotube is used, one kind of them may be used solely and two or more kinds of them may be mixed to be used. In addition, any metal material or conductive polymer material that is a material having conductivity may be used in addition to the carbon material.

The separator 23 separates the positive electrode 21 and the negative electrode 22, prevents a current short circuit due to contact of both electrodes, and allows lithium ions to pass. The separator 23 includes, for example, a porous membrane made of a resin including polytetrafluoroethylene, polypropylene or polyethylene, and may have a structure in which two or more of such porous membranes are laminated. Among these, a porous membrane made of a polyolefin is preferable because it has an excellent short circuit preventing effect and can improve safety of a battery according to a shutdown effect. In particular, the polyethylene is preferable as a material of the separator 23 because it can have a shutdown effect in a range of 100° C. or higher and 160° C. or lower and has excellent electrochemical stability. Also, a resin having chemical stability can be used in copolymerization or as a material blended with polyethylene or polypropylene. As an alternative, the porous film may have such a structure that includes three or more layers in which the polypropylene layer, the polyethylene layer, and the polypropylene layer are laminated in this order.

The separator 23 may have such a structure that includes a substrate and a surface layer on one or each of sides of the substrate. The surface layer includes inorganic particles having electrical insulation property, and a resin material for adhering the inorganic particles on a surface of the substrate, and binding the inorganic particles together. For example, the resin material may be fibrillated, thereby having a 3-dimensional network structure in which fibrils are continuously interconnected. By being held in the resin material having such a 3-dimensional structure, the inorganic particles can be dispersed without being connected with each other. Moreover, the resin material may bind the inorganic particles to the surface of the substrate or bind the inorganic particles together without being fibrillated. In this case, a higher binding can be achieved. By having the surface layer on one or each of the sides of the substrate, it is possible to give the substrate an oxidation resistance, a heat resistance, and a mechanical strength.

The substrate is a porous layer having porosity. More specifically, the substrate is a porous film that is an insulating film having a high ion permeability and a predetermined mechanical strength and is configured to hold the electrolysis solution in pores of the substrate. It is preferable that the substrate have the predetermined mechanical strength as a main part of the separator, and have a high resistance to the electrolysis solution, and a low reactivity, and be difficult to swell.

As a resin material constituting the substrate, polyolefin resins such as polypropylene and polyethylene, acryl resins, styrene resins, polyester resins, nylon resins, and the like are preferably usable. Especially, polyethylene such as low-density polyethylene, high-density polyethylene, and liner polyethylene, or low molecular weight wax thereof, or polyolefin resins such as polypropylene can be preferably usable due to their adequate melting temperatures and easy availability. Furthermore, the porous film may have such a structure that two or more kinds of these porous films are laminated or may be a porous film prepared by melting and mixing two or more kinds of these resin materials. A separator including a porous film made from a polyolefin resin is excellent in separating the positive electrode 21 and the negative electrode 22, thereby making it possible to further reduce the deterioration of internal short-circuit.

The substrate may be non-woven cloth. Fibers constituting the non-woven cloth may be aramid fibers, glass fibers, polyolefin fibers, polyethylene terephthalate (PET) fibers, nylon fibers, or the like. Moreover, the non-woven cloth may include a mix of two or more kinds of these fibers.

The inorganic particles include at least one kind of a metal oxide, a metal nitride, a metal carbide, a metal sulfide, or the like. As the metal oxide, aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), or the like may be suitably used. Moreover, as the metal nitride, silicon nitride ($Si_3N_4$), aluminum nitride (AlN), boron nitride (BN), titanium nitride (TiN) or the like may be suitably used. As the metal carbide, silicon carbide (SiC), boron carbide ($B_4C$) or the like may be suitably used. As the metal sulfide, barium sulfate ($BaSO_4$) or the like may be suitably used. Moreover, minerals such as porous aluminosilicate such as zeolite ($M_{2/n} \cdot Al_2O_3 \cdot xSiO_2 \cdot yH_2O$, where M is a metal element, X≥2, and y≥0), lamellar aluminosilicate, barium titanate ($BaTiO_3$), or strontium titanate are usable ($SrTiO_3$), too. Among them, it is preferable to use alumina, titania (especially titania with a rutile structure), silica, or magnesia, and it is more preferable to use alumina. The inorganic particles have an oxidation resistance and a heat resistance, so that the surface layer with the inorganic particles on the side facing to the positive electrode has a high resistance even to an oxidation environment near the positive electrode in charging. A shape of the inorganic particles are not particularly limited may be spherical, plate-like, fiber-like, cubic, random, or the like.

Examples of the resin material constituting the surface layer includes fluorine resins such as polyvinylidene and polytetrafluoroethylene, fluorine rubber such as vinylidene-tetrafluoroethylene copolymer and ethylene-tetrafluoroethylene copolymer, styrene-butadiene copolymer and a hydrides thereof, acrylonitrile-butadiene copolymer and a hydride thereof, acrylonitrile-butadiene-styrene copolymer and a hydride thereof, methacrylic ester-acrylic ester copolymer, styrene-acrylic ester copolymer, acrylonitrile-acrylic ester, rubber such as ethylene propylene rubber, polyvinyl alcohol, and polyvinyl acetate, cellulose derivatives such as ethyl cellulose, methyl cellulose, hydroxy ethyl cellulose, and carboxy methyl cellulose, polyamides such as polyphenylene, polysulfone, polyethersulfone, polyphenylene sulfide, polyetherimide, polyimide, wholly aromatic polyamide (aramid), polyamideimide, polyacrylonitrile, polyvinyl alcohol, polyether, acrylic acid resin, polyester, and the like resin having such a high heat resistance that at least one of a melting point or a glass transition temperature thereof is equal to or higher than 180° C. These resin materials may be used solely or two or more of them may be mixed and used in combination. Among them, in view of the oxidation resistance and flexibility, fluorine resins such as polyvinylidene fluoride is preferable, and in view of the heat resistance, it is preferable to include aramid or polyamideimide.

It is preferable that the inorganic particles be in a range of 1 nm to 10 μm in particle diameter. If the particle diameter is less than 1 nm, the availability is low, and even if such inorganic particles are available, the use thereof is not favorable in terms of cost. On the other hand, if the particle diameter is greater than 10 μm, an interelectrode distance would be excessively large, so that an amount of the active material filled in a limited space would not be sufficient, whereby a battery capacity would be low.

An exemplary applicable method for forming the surface layer may be a method including applying a slurry including a matrix resin, a solvent, and an inorganic material on a substrate (porous film), passing the substrate into a solvent bath of a solvent that is a poor solvent for the matrix resin and a good solvent for the solvent so as to cause phase separation thereof, and drying the substrate thereafter.

The inorganic particles may be contained in the porous film serving as the substrate. Furthermore, the surface layer may be constituted solely with a resin material without the inorganic particles.

The separator 23 is impregnated with an electrolysis solution which is electrolyte in a liquid form. The electrolysis solution contains a solvent and an electrolyte salt dissolved in the solvent. In order to improve a battery characteristic, the electrolysis solution may include a known additive.

As the solvent, a cyclic carbonate such as ethylene carbonate and propylene carbonate can be used and it is preferable to use one of ethylene carbonate and propylene carbonate, particularly, a mixture of both. This is because cycle characteristics can be improved.

In addition to these cyclic carbonates, as the solvent, an open-chain carbonate such as diethyl carbonate, dimethyl carbonate, ethyl methyl carbonate and methyl propyl carbonate is preferable to be used as a mixture with those. This is because high ion conductivity can be attained.

Furthermore, the solvent is preferable to contain 2,4-difluoroanisole and/or vinylene carbonate. This is because 2,4-difluoroanisole can improve discharge capacity and vinylene carbonate can improve cycle characteristics. Accordingly, mixing these to be used is preferable since the discharge capacity and the cycle characteristics can be improved.

Other than these, examples of the solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethylformamide, N-methylpyrrolidinone, N-methyloxazolidinone, N,N-dimethylimidazolidinone, nitromethane, nitroethane, sulfolane, dimethylsulfoxide, and trimethyl phosphate.

In addition, a compound obtained by substituting fluorine for at least part of hydrogen of any of these non-aqueous solvents is sometimes preferable since reversibility of the electrode reaction can be sometimes improved depending on kinds of electrodes used as a combination.

Examples of the electrolyte salt include, for example, lithium salts, one kind of them may be used solely and two or more kinds of them may be mixed to be used. Examples of the lithium salts include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium difluoro[oxolato-O,O']borate, lithium bisoxalate borate, and LiBr. Above all, $LiPF_6$ is preferable to be able to attain high ion conductivity and improve cycle characteristics.

The positive electrode potential in the full charge state (vsLi/Li$^+$) is preferably 4.40 V or higher, more preferably 4.45 V or higher, or further preferably 4.50 V or higher. This is because, with a battery for high charge voltage whose positive electrode potential in the full charge state is 4.40 V or higher (vsLi/Li$^+$), the effects of reducing the deterioration of the charge and discharge cycle property and reducing the gas generation can be significantly attained. An upper limit of the positive electrode potential in the full charge state (vsLi/Li$^+$) is not particularly limited, but is preferably 6.00 V or less, more preferably 5.00 V or less, further preferably 4.80 V or less, or especially preferably 4.70 V or less.

In the battery having the above-described configuration, when charging is performed, for example, lithium ions are deintercalated from the positive electrode active material layer 21B, and intercalated into the negative electrode active material layer 22B with the electrolysis solution interposed therebetween. In addition, when discharging is performed, for example, lithium ions are deintercalated from the negative electrode active material layer 22B and intercalated into the positive electrode active material layer 21B with the electrolysis solution interposed therebetween.

The following will show an example of a method for manufacturing the battery according to the second exemplary embodiment of the present technology.

First, for example, a positive electrode compound is prepared by mixing the positive electrode active material according to the first exemplary embodiment, a conducting agent, and a binding agent, and a paste-form positive electrode compound slurry is produced by dispersing the positive electrode compound into a solvent such as N-methyl-2-pyrrolidinone (NMP). Next, the positive electrode compound slurry is applied on the positive electrode collector 21A, the solvent is dried, and the dried mixture is compression molded with a rolling press machine or the like, so that the positive electrode active material layer 21B is formed and the positive electrode 21 is obtained.

Further, for example, a negative electrode mixture is produced by mixing a negative electrode active material and a binding agent, and a paste-form negative electrode mixture slurry is prepared by dispersing this negative electrode mixture in a solvent such as N-methyl-2-pyrrolidone. Next, the negative electrode mixture slurry is applied on the negative positive electrode collector 22A, the solvent is dried, and the dried mixture is compression molded with a rolling press machine or the like, so that the negative electrode active material layer 22B is formed and the negative electrode 22 is obtained.

Next, the positive electrode lead 25 is attached to the positive electrode collector 21A by welding or the like, and the negative electrode lead 26 is attached to the negative positive electrode collector 22A by welding or the like. Next, the positive electrode 21 and the negative electrode 22 are wound via the separator 23. Next, the tip part of the positive electrode lead 25 is welded to the safety valve mechanism 15, the tip part of the negative electrode lead 26 is welded to the battery can 11, and the wound positive electrode 21 and negative electrode 22 are interposed between the pair of insulator plates 12 and 13 and are contained inside the battery can 11. Next, after the positive electrode 21 and the negative electrode 22 are contained inside the battery can 11, the electrolysis solution is injected into the battery can 11 to impregnate the separator 23. Next, the battery lid 14, the safety valve mechanism 15 and the positive temperature coefficient element 16 are fixed to the opening end part of the battery can 11 by crimping via the opening sealing gasket 17. Thereby, the battery shown in FIG. 6 is obtained.

The battery according to the second exemplary embodiment includes the positive electrode 21 including the positive electrode active material according to the first exemplary embodiment. With this configuration, it becomes possible to reduce the deterioration of the charge and discharge cycle property and reduce the gas generation. Therefore, it becomes possible to attain a battery with excellent reliability. This effect can be especially significantly attained in the case of a battery for high charging voltage, in which the positive electrode potential in the full charge state is 4.40 V or higher (vsLi/Li$^+$).

Figure 8:
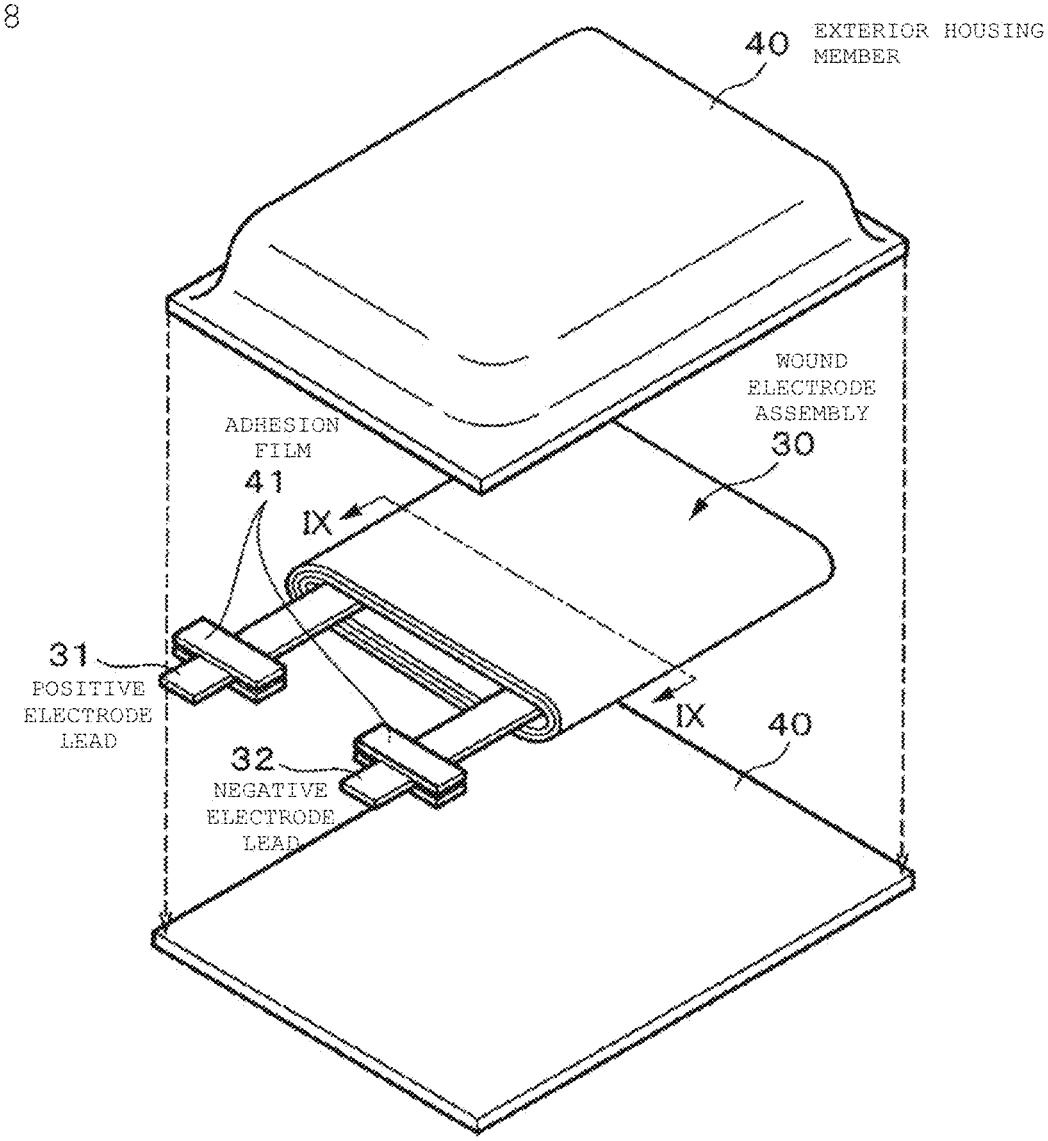
FIG. 8 is an exploded perspective view showing an example of a configuration of a non-aqueous electrolyte secondary battery according to an embodiment of the present disclosure.

As illustrated in FIG. 8, a battery according to a third exemplary embodiment of the present technique is a so-called laminate film-type battery, is configured such that a wound electrode assembly 30 including a positive electrode lead 31 and a negative electrode lead 32 is accommodated in an exterior housing member 40 in a form of a film, thereby making it possible to attain further miniaturization, lighter weight, and thinner thickness.

Each of the positive electrode lead 31 and the negative electrode lead 32 is led out from the inside of the exterior housing member 40 toward the outside in the same direction, for example. The positive electrode lead 31 and the negative electrode lead 32 are each formed using, for example, a metal material such as aluminum, copper, nickel, or stainless steel, in a thin plate state or a network state.

Each of the exterior housing members 40 is configured, for example, of a rectangular aluminum laminate film obtained by pasting a nylon film, an aluminum foil and a polyethylene film in this order. Each of the exterior housing members 40 is disposed, for example, such that the polyethylene film side thereof faces the wound electrode assembly 30, and their outer edge parts adhere to each other by fusion or with an adhesive. Adhesion films 41 are inserted between the exterior housing members 40 and the positive electrode lead 31 and negative electrode lead 32 to prevent intrusion of the air. The adhesion film 41 is configured of a material having adherence with respect to the positive electrode lead 31 and the negative electrode lead 32, which material is, for example, polyolefin resin such as polyethylene, polypropylene, modified polyethelene and modified polypropylene.

It should be understood that the metal layer of the exterior housing member 40 may also be formed using a laminated film having another lamination structure, or a polymer film such as polypropylene or a metal film, instead of the above-described aluminum laminated film. Alternatively, a laminate film may be used as a core and a polymer film is laminated on one side or both sides thereof may be used.

Figure 9:
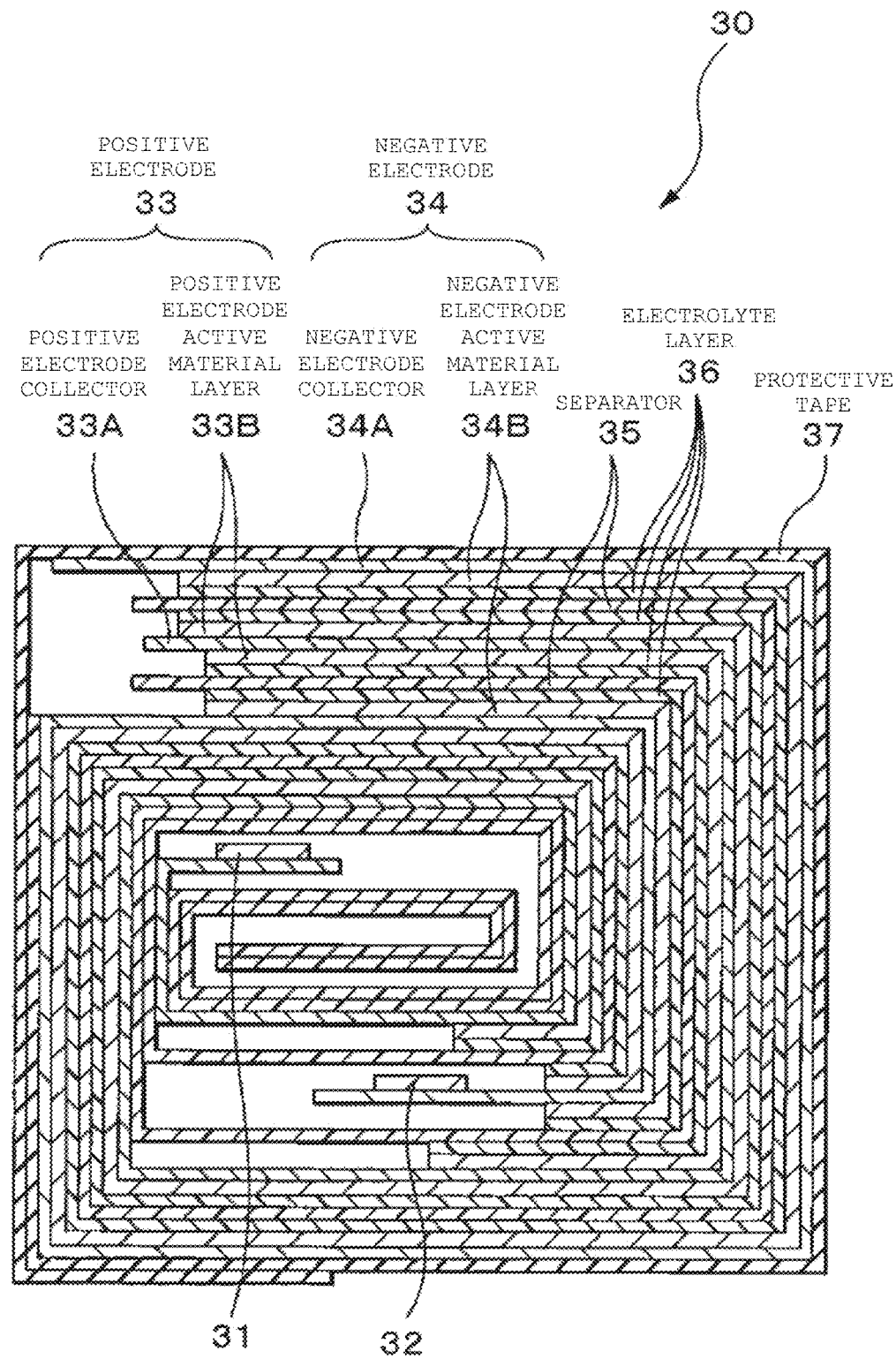
FIG. 9 is a cross-sectional view taken along the IX-IX line in FIG. 8.

FIG. 9 shows a cross-sectional structure along a IX-IX line of the wound electrode assembly 30 shown in FIG. 8. This wound electrode assembly 30 is prepared by laminating a positive electrode 33 and a negative electrode 34 with a separator 35 and an electrolyte layer 36 interposed therebetween and winding the laminate, and an outermost peripheral portion thereof is protected by a protective tape 37.

The positive electrode 33 has a structure in which positive electrode active material layers 33B are provided on one side or both sides of the positive electrode collector 33A. The negative electrode 34 has a structure in which negative electrode active material layers 34B are provided on one side or both sides of the negative positive electrode collector 34A, and the negative electrode active material layer 34B is disposed so as to face the positive electrode active material layer 33B. The configurations of the positive electrode collector 33A, the positive electrode active material layer 33B, the negative positive electrode collector 34A, the negative electrode active material layer 34B and the separator 35 are similar to those of the positive electrode collector 21A, the positive electrode active material layer 21B, the negative positive electrode collector 22A, the negative electrode active material layer 22B and the separator 23 in the second exemplary embodiment, respectively.

The electrolyte layer 36 contains an electrolysis solution and a polymer compound which is a retention body retaining the electrolysis solution, and is in a so-called gel form. The gel-form electrolyte layer 36 is preferable to be able to attain high ion conductivity and prevent leakage in the battery. The electrolysis solution is the electrolysis solution according to the second exemplary embodiment. Examples of the polymer compound include, for example, polyacrilonitrile, polyvinylidene fluoride, copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polystyrene and polycarbonate. Particularly, in view of electrochemical stability, polyacrilonitrile, polyvinylidene fluoride, polyhexafluoropropylene or polyethylene oxide is preferable.

The electrolyte layer 36 may contain inorganic particles. Because this can improve the heat resistance. The inorganic particles may be ones equivalent to the inorganic particles contained in the surface layer of the separator 23 in the second exemplary embodiment. Moreover, an electrolysis solution may be used instead of the electrolyte layer 36. Furthermore, instead of the wound electrode assembly 30, a laminate-type electrode assembly (stack-type electrode assembly) in which a positive electrode and a negative electrode are laminated with a separator therebetween may be used.

The following will show an example of a method for manufacturing the battery according to the third exemplary embodiment of the present technology.

A precursor solution including a solvent, an electrolyte salt, a polymer compound, and a mixed solvent is applied on surfaces of each of the positive electrode 33 and the negative electrode 34, and the mixed solvent is then volatilized to form the electrolyte layer 36. Next, the positive electrode lead 31 is welded to the end of the positive electrode collector 33A, and the negative electrode lead 32 is welded to the end of the negative positive electrode collector 34A. Subsequently, the positive electrode 33 and the negative electrode 34 each having the electrolyte layer 36 formed thereon are laminated with the separator 35 interposed therebetween to form a laminate. Then the laminate is wound in a longitudinal direction thereof and the protective tape 37 is adhered to an outermost peripheral portion to form the wound electrode assembly 30. Finally, for example, the wound electrode assembly 30 is interposed between the exterior housing members 40, and the outer periphery portions of the exterior housing members 40 are adhered to each other by means of heat fusion or the like, thereby enclosing the wound electrode assembly 30 therein. On that occasion, the adhesion film 41 is inserted between each of the positive electrode lead 31 and the negative electrode lead 32 and the exterior housing member 40. There is thus obtained a battery shown in FIGS. 8 and 9.

Alternatively, the battery may be produced as follows. First of all, in the above-described manner, the positive electrode 33 and the negative electrode 34 are produced, and the positive electrode lead 31 and the negative electrode lead 32 are attached to the positive electrode 33 and the negative electrode 34, respectively. After that, the positive electrode 33 and the negative electrode 34 are laminated with the separator 35 interposed therebetween, the laminate is wound, and the protective tape 37 is adhered to an outermost peripheral portion, thereby forming a wound body. Next, the wound body is interposed between the exterior housing members 40, the outer peripheral portions except for one side are adhered to each other by heat fusion to make a bag form, and the wound electrode assembly 30 is housed in the inside of the exterior housing member 40. Subsequently, an electrolyte composite including, a solvent, an electrolyte salt, a monomer which is a raw material of a polymer compound, a polymerization initiator, and another material such as a polymerization inhibitor as necessary is prepared and injected into the inside of the exterior housing member 40.

Next, the opening part of the exterior housing member 40 undergoes thermal fusion under a vacuum atmosphere to be sealed after the electrolyte composite is injected into the inside of the exterior housing member 40. Next, it is applied with heat such that the monomer is polymerized to be a polymer compound, formed into the gel-form electrolyte layer 36. As above, the secondary battery shown in FIGS. 8 and 9 is obtained.

The battery according to the third exemplary embodiment includes the positive electrode 33 including the positive electrode active material according to the first exemplary embodiment or variations thereof. With this configuration, it becomes possible to reduce the deterioration of the charge and discharge cycle property and reduce the battery swellings. Therefore, it becomes possible to attain a battery with excellent reliability. This effect can be especially significantly attained in the case of a battery for high charging voltage, in which the positive electrode potential in the full charge state is 4.40 V or higher (vsLi/Li$^+$).

Application Example 1 describes a battery pack and an electronic device including a battery according to the second or third exemplary embodiment.

Figure 10:
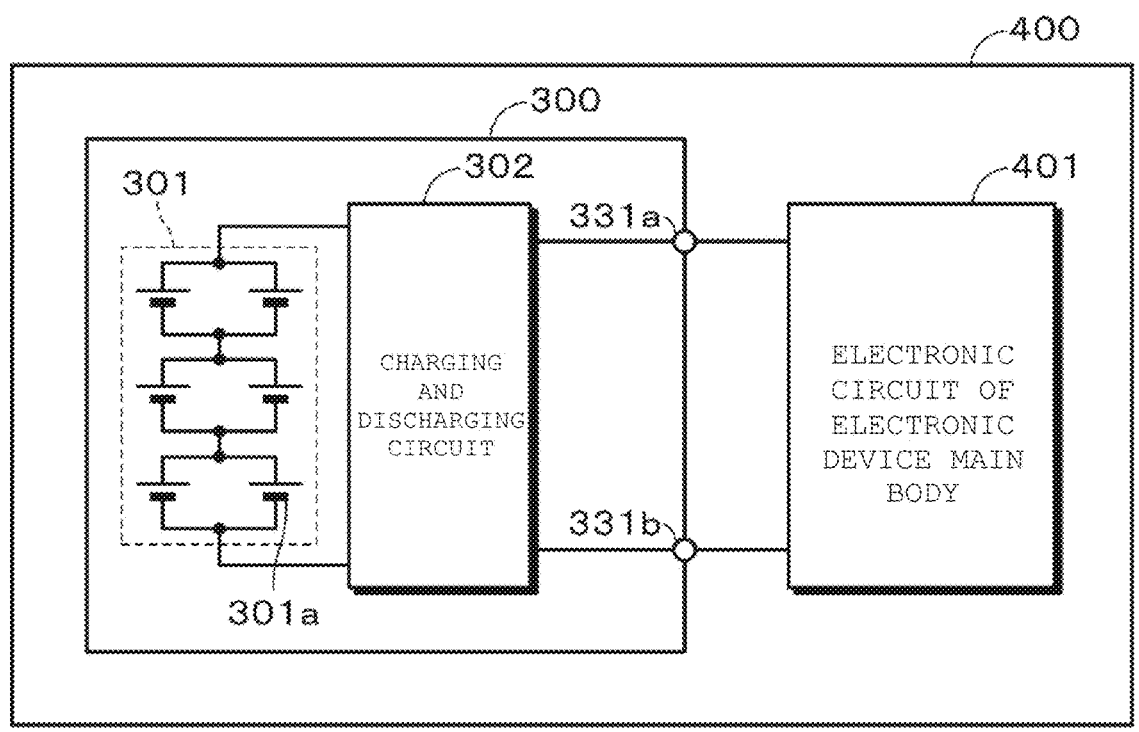
FIG. 10 is a block diagram illustrating one example of a configuration of an electronic device as one application example according to an embodiment of the present disclosure.

A configuration example of a battery pack 300 and an electronic device 400 as an application example will be described below with reference to FIG. 10. The electronic device 400 includes an electronic circuit 401 of an electronic device main body and the battery pack 300. The battery pack 300 is electrically connected to the electronic circuit 401 with a positive electrode terminal 331a and a negative electrode terminal 331b interposed therebetween. The electronic device 400 has, for example, a configuration in which the battery pack 300 is detachable by a user. However, the configuration of the electronic device 400 is not limited thereto, and a configuration in which the battery pack 300 is built in the electronic device 400 so that the user is unable to remove the battery pack 300 from the electronic device 400 may be used.

When the battery pack 300 is charged, the positive electrode terminal 331a and the negative electrode terminal 331b of the battery pack 300 are connected to a positive electrode terminal and a negative electrode terminal of a charger (not shown), respectively. On the other hand, when the battery pack 300 is discharged (when the electronic device 400 is used), the positive electrode terminal 331a and the negative electrode terminal 331b of the battery pack 300 are connected to a positive electrode terminal and a negative electrode terminal of the electronic circuit 401, respectively.

Examples of the electronic device 400 include a notebook personal computer, a tablet computer, a mobile phone (for example, a smartphone), a personal digital assistant (PDA), a display device (for example, an LCD, an EL display, an electronic paper), an imaging device (for example, a digital still camera and a digital video camera), an audio device (for example, a portable audio player), a game device, a cordless phone extension unit, an E-book, an electronic dictionary, a radio, a headphone, a navigation system, a memory card, a pacemaker, a hearing aid, an electric tool, an electric shaver, a refrigerator, an air conditioner, a TV, a stereo, a water heater, a microwave, a dishwasher, a washing machine, a dryer, a lighting device, a toy, a medical device, a robot, a load conditioner, and a traffic light, and the present technology is not limited thereto.

The electronic circuit 401 includes, for example, a CPU, a peripheral logic unit, an interface unit, and a storage unit, and controls the entire electronic device 400.

The battery pack 300 includes an assembled battery 301 and a charging and discharging circuit 302. The assembled battery 301 includes a plurality of secondary batteries 301a that are connected in series and/or parallel. The plurality of secondary batteries 301a are connected, for example, in n parallel m series (n and m are positive integers). In addition, FIG. 10 shows an example in which six secondary batteries 301a are connected in 2 parallel 3 series (2P3S). As the secondary battery 301a, the battery according to the second or third exemplary embodiment is used.

Here, a case where the battery pack 300 includes an assembled battery 301 including a plurality of secondary batteries 301a will be described. However, the battery pack 300 may include a single secondary battery 301a instead of the assembled battery 301.

The charging and discharging circuit 302 is a control unit (controller) configured to control charging and discharging of the assembled battery 301. More specifically, when charging, the charging and discharging circuit 302 controls the charging of the assembled battery 301. On the other hand, when discharging (that is, when the electronic device 400 is in use), the charging and discharging circuit 302 controls the discharging to the electronic device 400. The controller includes a processor or the like.

Figure 11:
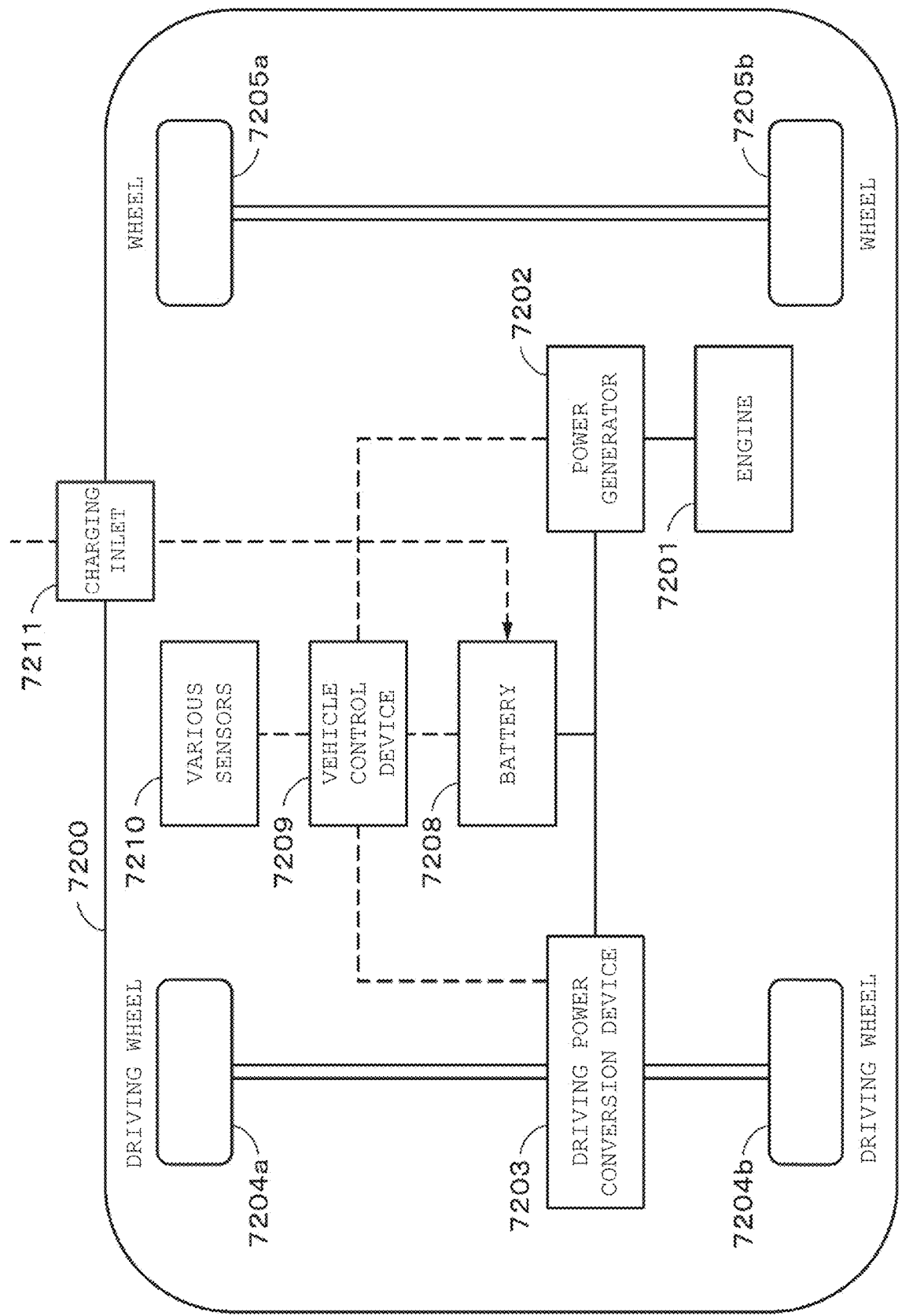
FIG. 11 is a block diagram illustrating one example of a configuration of an electric vehicle as one application example according to an embodiment of the present disclosure.

A case where the present disclosure is applied in a power storage system for vehicle will be described, referring to FIG. 11. FIG. 11 schematically illustrates one example of a configuration of a hybrid vehicle in which a series hybrid system to which the present disclosure is applied is adopted. The series hybrid system is a vehicle that uses power generated by a power generator that is moved by an engine or power that is generated by a power generator and stored temporarily in a battery and is operated by a driving power conversion device.

A hybrid vehicle 7200 incorporates an engine 7201, a power generator 7202, the driving power conversion device (converter) 7203, driving wheels 7204a and 7204b, wheels 7205a and 7205b, a battery 7208, a vehicle control device (controller) 7209, various sensors 7210, and a charging inlet 7211. For the battery 7208, the power storage device according to the present disclosure described above is applied.

The hybrid vehicle 7200 runs by using the driving power conversion device 7203 as a power source. One of examples of the driving power conversion device (converter) 7203 is a motor. Power in the battery 7208 drives the driving power conversion device 7203, and the rotating power of the driving power conversion device 7203 is transmitted to the driving wheels 7204a and 7204b. Note that by using DC/AC conversion or AC/DC conversion in a necessary portion, an alternate current motor or a direct current motor can be used for the driving power conversion device 7203. The various sensors 7210 control the number of engine rotation via the vehicle control device 7209 and controls the aperture of an unshown throttle valve (throttle aperture). The various sensors 7210 include a speed sensor, an acceleration sensor, a sensor of the number of engine rotation, and the like.

The rotating power of the engine 7201 is transmitted to the power generator 7202, and power generated by the power generator 7202 with the rotating power can be stored in the battery 7208.

When the hybrid vehicle reduces the speed with an unshown brake mechanism, the resisting power at the time of the speed reduction is added to the driving power conversion device 7203 as the rotating power, and regenerative power generated by the driving power conversion device 7203 with this rotating power is stored in the battery 7208.

The battery 7208 is connected to a power source outside the hybrid vehicle, receives power supply from the external power source using the charging inlet 211 as an input port, and can accumulate the received power.

Although not shown, an information processing device which performs information processing about vehicle control based on information about the secondary battery may be provided. Examples of such an information processing device include an information processing device which displays the remaining battery based on information about the remaining battery.

Note that the above description is made by taking an example of the series hybrid car which runs with a motor using power generated by a power generator driven by an engine or power obtained by storing the power in a battery. However, an embodiment of the present disclosure can also be applied effectively to a parallel hybrid car which uses the output of an engine and a motor as the driving power source and switches three modes as appropriate: driving with the engine only; driving with the motor only; and driving with the engine and the motor. Further, an embodiment of the present disclosure can also be applied effectively to a so-called electric vehicle which runs by being driven with a driving motor only, without an engine.

So far, one example of the hybrid vehicle 7200 to which the technique according to the present disclosure is applicable has been described. The technique according to the present disclosure is suitably applicable in the battery 7208 within the configuration described above.

Figure 12:
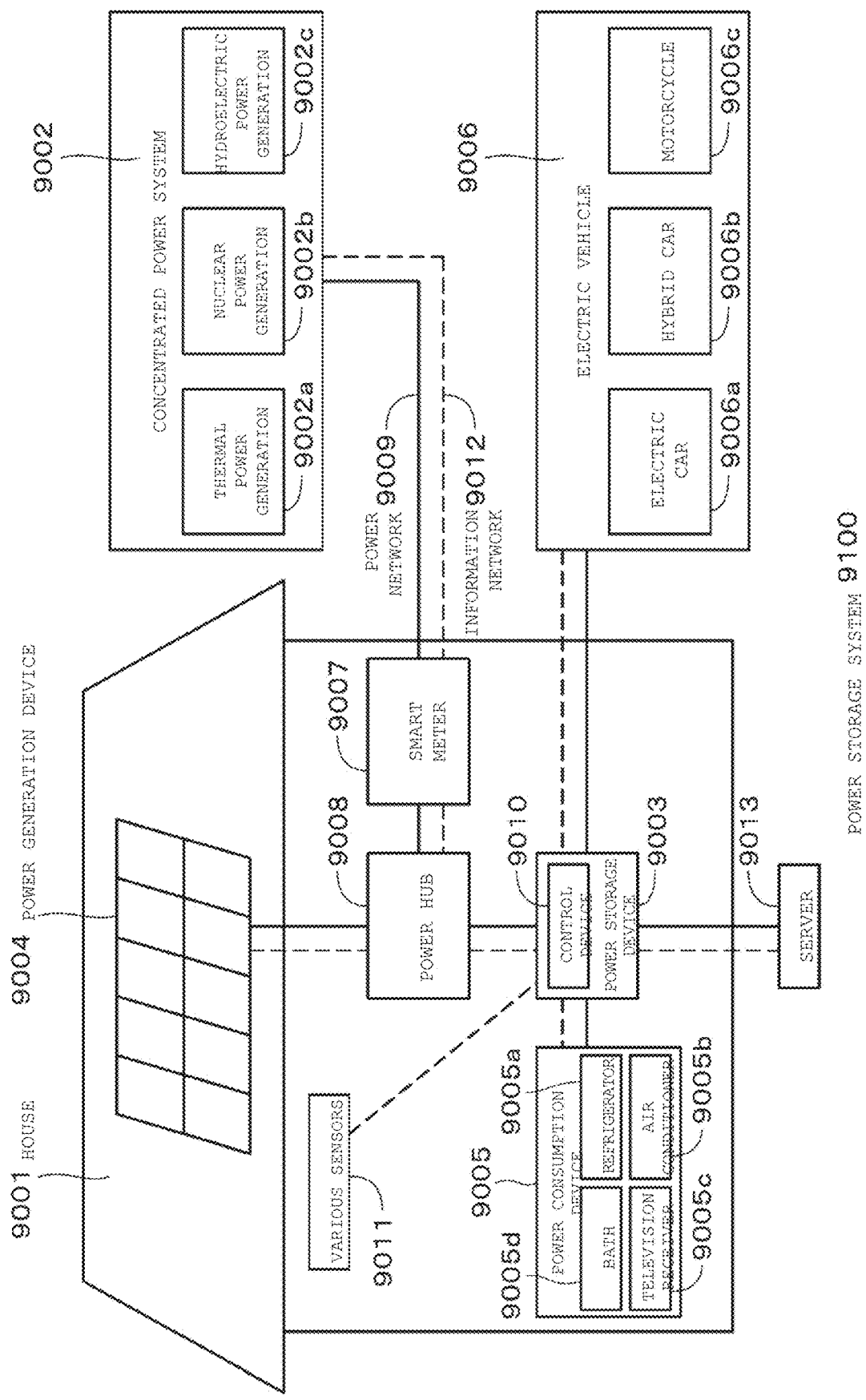
FIG. 12 is a block diagram illustrating one example of a configuration of a power storage system as one application example according to an embodiment of the present disclosure.

An example in which the present disclosure is applied in a power storage system for a residential premise will be described, referring to FIG. 12. For example, in the power storage system 9100 for the house 9001, power is supplied to the power storage device 9003 from a concentrated power system 9002 including thermal power generation 9002a, nuclear power generation 9002b, hydroelectric power generation 9002c, and the like, via a power network 9009, an information network 9012, a smart meter 9007, a power hub 9008, and the like.

Further, power is supplied to the power storage device 9003 from an independent power source such as a home power generation device 9004. Power supplied to the power storage device 9003 is stored. Power to be used in the house 9001 is fed with use of the power storage device 9003. The same power storage system can be used not only in the house 9001 but also in a building.

The house 9001 is provided with the power generation device 9004, a power consumption device 9005, the power storage device 9003, a control device (controller) 9010 which controls each device, the smart meter 9007, and sensors 9011 which acquires various pieces of information. The devices are connected to each other by the power network 9009 and the information network 9012. As the power generation device 9004, a solar cell, a fuel cell, or the like is used, and generated power is supplied to the power consumption device 9005 and/or the power storage device 9003. Examples of the power consumption device 9005 include a refrigerator 9005a, an air conditioner 9005b, a television receiver 9005c, a bath 9005d, and the like. Examples of the power consumption device 9005 further include an electric vehicle 9006. The electric vehicle 9006 is such as an electric car 9006a, a hybrid car 9006b, or a motorcycle 9006c.

The battery unit according to the present disclosure described above is applied to a power storage device 9003. The power storage device 9003 includes a secondary battery or a capacitor. For example, it is constituted by a lithium ion battery. The lithium ion battery may be a stationary type or be for use in the electric vehicle 9006. A smart meter 9007 has functions to measure a usage of a commercial power and transmit the measurement of the usage to an electric power company. A power network 9009 may be for any one of direct current power feeding, alternative current power feeding, or wireless charging, or for a combination of two or more of them.

Examples of the various sensors 9011 include a motion sensor, an illumination sensor, an object detecting sensor, a power consumption sensor, a vibration sensor, a touch sensor, a temperature sensor, an infrared sensor, and the like. Information acquired by the various sensors 9011 is transmitted to the control device 9010. With the information from the sensors 9011, weather conditions, people conditions, and the like are caught, and the power consumption device 9005 is automatically controlled so as to make the energy consumption minimum. Further, the control device 9010 can transmit information about the house 9001 to an external power company via the Internet, for example.

The power hub 9008 performs processes such as branching off power lines and DC/AC conversion. Examples of communication schemes of the information network 9012 connected to the control device 9010 include a method using a communication interface such as UART (Universal Asynchronous Receiver/Transmitter), and a method using a sensor network according to a wireless communication standard such as Bluetooth (registered trademark), ZigBee (registered trademark), or Wi-Fi. A Bluetooth (registered trademark) scheme can be used for multimedia communication, and one-to-many connection communication can be performed. ZigBee (registered trademark) uses a physical layer of IEEE (Institute of Electrical and Electronics Engineers) 802.15.4. IEEE802.15.4 is the name of a near-field wireless network standard called PAN (Personal Area Network) or W (Wireless) PAN.

The control device 9010 is connected to an external server 9013. The server 9013 may be managed by any of the house 9001, an electric company, and a service provider. Examples of information transmitted and received by the server 9013 include power consumption information, life pattern information, electric fee, weather information, natural disaster information, and information about power trade. Such information may be transmitted and received by the power consumption device (e.g., the television receiver) in the house, or may be transmitted and received by a device (e.g., a mobile phone) outside the house. Further, such information may be displayed on a device having a display function, such as the television receiver, the mobile phone, or the Personal Digital Assistant (PDA).

The control device 9010 controlling each part is configured with a CPU (Central Processing Unit) or a processor, a RAM (Random Access Memory), a ROM (Read Only Memory), and the like, and is stored in the power storage device 9003 in this example. The control device 9010 is connected to the power storage device 9003, the home power generation device 9004, the power consumption device 9005, the various sensors 9011, and the server 9013 via the information network 9012, and has a function of adjusting the used amount of commercial power and the power generation amount, for example. Note that the control device 9010 may further have a function of performing power trade in the power market.

As described above, power generated by not only the concentrated power system 9002 such as the thermal power 9002a, the nuclear power 9002b, and the hydroelectric power 9002c, but also the home power generation device 9004 (solar power generation or wind power generation) can be stored in the power storage device 9003. Therefore, even when the power generated by the home power generation device 9004 varies, the amount of power supplied to the outside can be constant, or only necessary discharge can be controlled. For example, power generated by the solar power generation can be stored in the power storage device 9003 and also inexpensive power at midnight can be stored in the power storage device 9003 during nighttime, so that power stored in the power storage device 9003 can be discharged and used when the power fee is expensive during daytime.

It should be understood that although this example shows the control device 9010 housed in the inside of the power storage device 9003, the control device 9010 may be housed in the inside of the smart meter 9007 or configured independently. Further, the power storage system 9100 may be used for a plurality of houses in a multiple dwelling house or a plurality of separate houses.

So far, one example of the power storage system 9100 to which the technique according to the present disclosure is applicable has been described. The technique according to the present disclosure is suitably applicable to the secondary battery of the power storage device 9003 within the configuration described above.

EXAMPLES

In the following, the present disclosure will be concretely described referring to Examples, but the present disclosure is not limited to these Examples. For example, a method of synthesizing the positive electrode active material ($LiCoO_2$) used in Examples is merely one example of how to obtain a desirable positive electrode active material, and the synthesis of the positive electrode active material is not limited to this method.

Example 1

To begin with, $LiOH \cdot H_2O$ and $Co_3O_4$ of amounts stoichiometric proportional to $LiCoO_2$ were measured out and wet-mixed in a mortar with an appropriate amount of pure water added therein, thereby obtaining a mixture. Next, the mixture was heated in an electric furnace at a heating rate of 3° C./min to 600° C. When the temperature reached 600° C., the mixture was kept at the temperature for 20 h, and after that, the mixture was again heated at the heating rate of 3° C./min to 900° C. After that, the mixture was subjected to firing process in an atmospheric environment of 900° C. for 10 h. After the environment was cooled back to a room temperature by natural cooling, a fired product thus obtained was taken out and crushed in a mortar, thereby obtaining $LiCoO_2$ as a positive electrode active material.

By using the positive electrode active material thus obtained, a positive electrode was prepared as follows. To begin with, the positive electrode active material ($LiCoO_2$), a conducting agent (carbon black), and a binding agent (polyvinylidene fluoride) were mixed together to attain a mass ratio of positive electrode active material:conducting agent:binding agent=90:5:5, thereby obtaining a positive electrode compound. Next, after adding an appropriate amount of N-methyl-2-pyrolidone (NMP) therein, the positive electrode compound was mixed to obtain a positive electrode compound slurry, which was, thereafter, applied on a positive electrode collector (Al foil) and dried, thereby forming a positive electrode active material layer. Finally, using a pressing machine, the positive electrode active material layer was compression-molded thereby to obtain a positive electrode. Finally, using a pressing machine, the positive electrode active material layer was compression-molded thereby to obtain a negative electrode.

A negative electrode was prepared as follows. To begin with, a negative electrode active material (graphite material) and a binding agent (polyvinylidene fluoride) were mixed together to attain a mass ratio of negative electrode active material:binding agent=95:5, thereby obtaining a negative electrode compound. Next, after adding an appropriate amount of N-methyl-2-pyrolidone (NMP) therein, the negative electrode compound was mixed to obtain a negative electrode compound slurry, which was, thereafter, applied on a negative positive electrode collector (Cu foil) and dried, thereby forming a negative electrode active material layer. Finally, using a pressing machine, the negative electrode active material layer was compression-molded thereby to obtain a negative electrode.

A non-aqueous electrolysis solution was prepared as follows. To being with, ethylene carbonate (EC) and dimethyl carbonate (DMC) were mixed to attain a mass ration of EC:DMC=1:1, thereby preparing a mixture solvent. Next, into the mixture solvent, lithium hexafluorophosphate ($LiPF_6$) was dissolved as an electrolyte salt to attain 1 mol/kg, thereby preparing the non-aqueous electrolysis solution.

A laminate film-type lithium ion secondary battery was prepared as follows. To being with, a positive electrode lead and negative electrode lead were welded to each positive electrode and each negative electrode thus prepared, respectively. After that, the positive electrodes and the negative electrodes are alternatively laminated with a separator therebetween, thereby preparing an electrode assembly.

Next, the electrode assembly was mounted between an exterior housing member folded, and two of three edges of the exterior housing member were closed by thermally fusing with the remaining of the three edges not thermally fused but left open as an opening. The exterior housing member used was a moisture-proofed aluminum laminate film in which a nylon film of 25 µm in thickness, an aluminum foil of 40 µm in thickness, and a polypropylene film of 30 µm in thickness are laminated in this order from the outermost. After that, the non-aqueous electrolysis solution was poured into the exterior housing member from the opening, and the remaining edge of the exterior housing member was closed by thermal fusing under reduced pressure, thereby sealing the electrode assembly within the exterior housing member. In this way, a laminate film-type battery as intended was prepared. This laminate film-type battery was one designed to obtain an open-circuit voltage (that is, battery voltage) of 4.50 V in the full charge stage by adjusting the mass of the positive electrode active material and the mass of the negative electrode active material.

Example 2

A battery was prepared as in Example 1, except that the process of synthesizing the positive electrode active material kept the temperature of 600° C. for 100 h when the temperature reached to 600° C.

Example 3

A battery was prepared as in Example 2, except that, after the process of synthesizing the positive electrode active material increased the temperature to 900° C. again at the heating rate of 3° C./min after keeping the temperature of 600° C. for 100 h, the process carried out the firing process with a temperature of 900° C. for 100 h in the atmospheric environment.

Example 4

A battery was prepared as in Example 3, except that, after the process of synthesizing the positive electrode active material carried out the firing process of 900° C. for 100 h in the atmospheric environment, the process cooled the temperature back to the room temperature at a rate of 1° C./min. Note that, when the furnace temperature fell near the room temperature, it was in a natural cooling state if the cooling rate was greater than the natural cooling rate.

Example 5

A battery was prepared as in Example 4, except that, after the process of synthesizing the positive electrode active material carried out the firing process of 900° C. for 100 h in the atmospheric environment, a step of keeping the temperature of 600° C. for 100 h when the temperature reached 600° C. by a cooling at a cooling rate of 1° C./min was additionally included.

Comparative Example 1

To begin with, $LiOH \cdot H_2O$ and $Co_3O_4$ of amounts stoichiometric proportional to $LiCoO_2$ were measured out and wet-mixed in a mortar with an appropriate amount of pure water added therein, thereby obtaining a mixture. Next, the mixture was heated to 900° C. in an electric furnace at a heating rate of 3° C./min, and subjected to a firing process of 900° C. for 10 h in an atmospheric environment. After cooled back to a room temperature by natural cooling, a fired product was taken out and crushed in a mortar, thereby obtaining $LiCoO_2$.

Except that the positive electrode active material thus prepared was used, a battery was prepared as in Example 1.

Comparative Example 2

A battery was prepared as in Comparative Example 1, except that, after the process of synthesizing the positive electrode active material carried out the heating to 900° C., the process carried out the firing process with a temperature of 900° C. for 20 h in the atmospheric environment.

The laminate film-type batteries thus prepared were evaluated by the following evaluations.

The batteries of Examples 1 to 5, and Comparative Examples 1 and 2 were evaluated in terms of the charge and discharge cycle property as below. To begin with, the charge and discharge cycles were repeated 100 times, working out an initial discharging capacity and a discharging capacity at 100 cycles. Note that, one cycle included a constant-current constant-voltage charging process with a charging current of 20 mA per 1 g of the positive electrode active material and a charging voltage of 4.50 V, and then a constant-current discharging process with a charging current of 20 mA per 1 g of the positive electrode active material and a charging voltage of 3 V. Next, a discharge capacity maintaining ratio was worked out from the following equation.

Discharge Capacity Maintaining Ratio [%]=(Discharging Capacity at 100 cycles/Discharging Capacity at 1 cycle)×100

Furthermore, the battery of Example 5 that was the best in the charge and discharge cycle property evaluation and the battery of Comparative Example 1 that was the worst in the charging and discharging cycle property evaluation were evaluated again in terms of the charging and discharging cycle property with the charging voltages changed as follows. That is, the discharge capacity maintaining ratios were worked out as in the charge and discharge cycle evaluation with the charging voltage of 4.50 V, except that the charging voltages of 4.20 V, 4.25 V, 4.30 V, 4.35 V, or 4.40 V was used.

To begin with, the charging and discharging cycles (charging voltage: 4.20 V to 4.50 V) were repeated 100 times as in the "charge and discharge cycle property evaluation", measuring thicknesses of the battery before and after the 100 charging and discharging cycles. Next, a swelling ratio of the battery was worked out from the following equation.

Swelling Ratio [%]=(Battery Thickness After 100 Charging and Discharging Cycles)/(Battery Thickness Before 100 Charging and Discharging Cycles)×100

To begin with, the charging and discharging cycles (charging voltage: 4.20 V to 4.50 V) were repeated 100 times as in the "charge and discharge cycle property evaluation", and then the battery was disassembled to remove the positive electrode therefrom. Next, the positive electrode was washed with dimethyl carbonate and chopped to prepare a sample piece. The sample piece was observed with cross-sectional SEM observation, thereby obtaining a cross-sectional SEM image. Next, from the cross-sectional SEM image thus obtained, the number N of particles of 1 μm or greater in particle diameter (maximum feret diameter) was counted. Moreover, from among the particles of 1 μm or greater in particle diameter thus counted, the number n of reflective symmetry particles was counted. Here, where or not the positive electrode active material particles were reflective symmetry particles was determined based on whether or not the predetermined leaf-vein-shaped cracking occurred on the particle cross section. The above procedure was repeated until the number N of the particles of 1 μm or greater in particle diameter reached 100 or more. Finally, the content percentage R [%] of the reflective symmetry particles in the positive electrode active material (=(the number n of the reflective symmetry particles/the number N of the particles of 1 μm or greater in particle diameter)×100) was worked out.

Table 1 shows evaluation results of the cycle properties, battery swelling, and the content percentage R of the reflective symmetry particles in the batteries with the charging voltage of 4.50 V.

TABLE 1

|  | Cycle property discharge capacity maintaining ratio (%) | Battery swelling ratio (%) | Particles in question[2] | | Reflective symmetry particle[1] content percentage (%) |
|---|---|---|---|---|---|
|  |  |  | Total particle number (count) | Reflective symmetry particle[1] number (count) |  |
| Example 1 | 53 | 122 | 102 | 51 | 50 |
| Example 2 | 59 | 120 | 107 | 41 | 38 |
| Example 3 | 64 | 120 | 109 | 32 | 29 |
| Example 4 | 70 | 112 | 111 | 28 | 25 |
| Example 5 | 82 | 107 | 104 | 14 | 13 |
| Comparative Example 1 | 20 | 182 | 108 | 91 | 84 |
| Comparative Example 2 | 22 | 168 | 110 | 79 | 72 |

Table 2 shows evaluation results of the cycle properties, battery swelling, and the content percentage R of the reflective symmetry particles in the batteries with the charging voltage of 4.20 V.

TABLE 2

|  | Cycle property discharge capacity maintaining ratio (%) | Battery swelling ratio (%) | Particles in question[2] | | Reflective symmetry particle[1] content percentage (%) |
|---|---|---|---|---|---|
|  |  |  | Total particle number (count) | Reflective symmetry particle[1] number (count) |  |
| Example 5 | 99 | 101 | 102 | 0 | 0 |
| Comparative Example 1 | 99 | 101 | 105 | 0 | 0 |

Table 3 shows evaluation results of the cycle properties, battery swelling, and the content percentage R of the reflective symmetry particles in the batteries with the charging voltage of 4.25 V.

TABLE 3

|  | Cycle property discharge capacity maintaining ratio (%) | Battery swelling ratio (%) | Particles in question[2] | | Reflective symmetry particle[1] content percentage (%) |
|---|---|---|---|---|---|
|  |  |  | Total particle number (count) | Reflective symmetry particle[1] number (count) |  |
| Example 5 | 98 | 101 | 104 | 0 | 0 |
| Comparative Example 1 | 98 | 101 | 108 | 0 | 0 |

Table 4 shows evaluation results of the cycle properties, battery swelling, and the content percentage R of the reflective symmetry particles in the batteries with the charging voltage of 4.30 V.

TABLE 4

| | Cycle property | | Particles in question[2] | | Reflective |
|---|---|---|---|---|---|
| | discharge capacity maintaining ratio (%) | Battery swelling ratio (%) | Total particle number (count) | Reflective symmetry particle[1] number (count) | symmetry particle[1] content percentage (%) |
| Example 5 | 97 | 103 | 101 | 6 | 0 |
| Comparative Example 1 | 97 | 103 | 102 | 0 | 0 |

Table 5 shows evaluation results of the cycle properties, battery swelling, and the content percentage R of the reflective symmetry particles in the batteries with the charging voltage of 4.35 V.

TABLE 5

| | Cycle property | | Particles in question[2] | | Reflective |
|---|---|---|---|---|---|
| | discharge capacity maintaining ratio (%) | Battery swelling ratio (%) | Total particle number (count) | Reflective symmetry particle[1] number (count) | symmetry particle[1] content percentage (%) |
| Example 5 | 95 | 104 | 109 | 3 | 3 |
| Comparative Example 1 | 91 | 107 | 103 | 9 | 9 |

Table 6 shows evaluation results of the cycle properties, battery swelling, and the content percentage R of the reflective symmetry particles in the batteries with the charging voltage of 4.40 V.

TABLE 6

| | Cycle property | | Particles in question[2] | | Reflective |
|---|---|---|---|---|---|
| | discharge capacity maintaining ratio (%) | Battery swelling ratio (%) | Total particle number (count) | Reflective symmetry particle[1] number (count) | symmetry particle[1] content percentage (%) |
| Example 5 | 90 | 105 | 106 | 7 | 7 |
| Comparative Example 1 | 61 | 132 | 104 | 38 | 37 |

In Tables 1 to 6, 1) and 2) mean the followings.
1) Positive electrode active material particles that have a grain boundary and that c axes (crystal axes) of the two regions sandwiching the grain boundary are in reflective symmetry.
2) Positive electrode active material particles of 1 μm or greater in particle diameter (maximum feret diameter) in the cross-sectional SEM image observed.

Figure 13A:
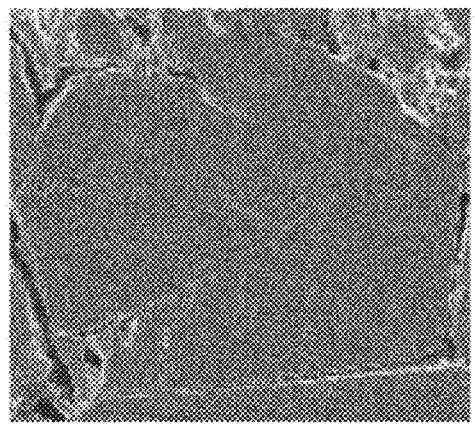
FIG. 13A is a cross-sectional SEM image of a particle in which leaf-vein-shaped cracking is starting.
Figure 13B:
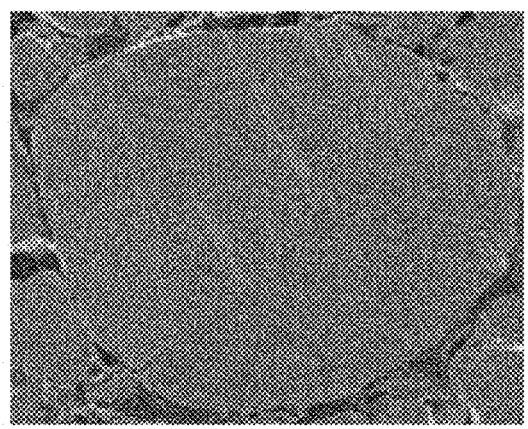
FIG. 13B is a cross-sectional SEM image of a particle in which leaf-vein-shaped cracking is proceeding.
Figure 13C:
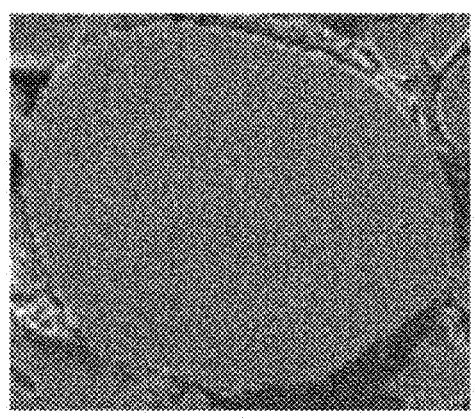
FIG. 13C is a cross-sectional SEM image of a particle without cracking according to an embodiment of the present disclosure.
Figure 14A:
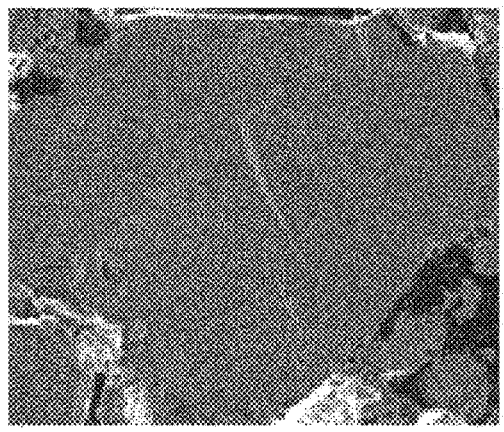
FIG. 14A is a cross-sectional SEM image of a three-crystalline-grain particle.
Figure 14B:
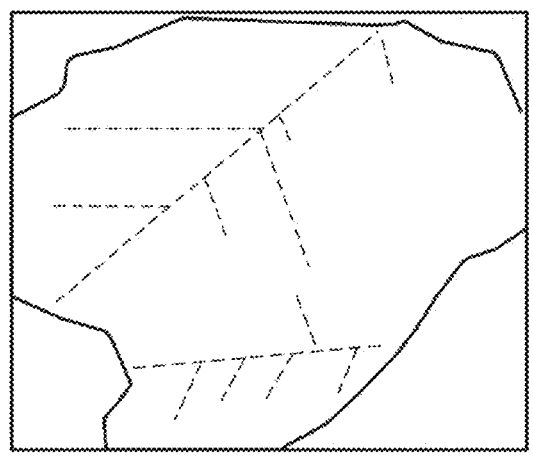
FIG. 14B is a view schematically illustrating the leaf-vein-shaped cracking in FIG. 14A according to an embodiment of the present disclosure.

FIG. 13A is a cross-sectional SEM image of a particle in which the leaf-vein-shaped cracking is starting. FIG. 13B is a cross-sectional SEM image of a particle in which the leaf-vein-shaped cracking is proceeding. FIG. 13C is a cross-sectional SEM image of a particle without the cracking. FIG. 14A is a cross-sectional SEM image of a particle constituted with three crystalline grains. FIG. 14B schematically illustrates the leaf-vein-shaped cracking in FIG. 14A.

The evaluations proved the followings. That is, in the batteries of Comparative Examples 1 and 2 with a content percentage R of greater than 50%, the cycle property was low and the battery swelling was large. This is because the number of particles cracked in charging and discharging in the high potential region was large, thereby increasing the active material surface. On the other hand, in the batteries of Examples 1 to 5 with a content percentage R of 50% or less, the cycle property was high and the battery swelling was down-regulated. In the batteries of Examples 4 and 5 with a content percentage R of 25% or less, the cycle property was especially high and the battery swelling was especially down-regulated. This is because the number of particles cracked in charging and discharging in the high potential region was small, thereby down-regulating the increase of the active material surface.

Moreover, the evaluations demonstrated the followings (see FIGS. 1 to 6). That is, at 4.20 V to 4.30 V, the cycle properties and the battery swellings of Example 5 and Comparative Example 1 were equivalent to each other. On the other, at 4.35 V, a slight difference between the cycle properties and the battery swellings of Example 5 and Comparative Example 1 was observed, and the difference became significant at 4.40 V or higher.

The embodiments, variations thereof, and examples of the present disclosure have been specifically described above. However, the present disclosure is not limited to the above-described embodiments, variations thereof, and examples. Various modifications of the present technology can be made without departing from the technical spirit of the present disclosure.

For example, the configurations, the methods, the processes, the shapes, the materials, the numerical values, and the like mentioned in the above-described embodiments, variations thereof, and examples are merely examples. Different configurations, methods, processes, shapes, materials, numerical values, and the like may be used, as necessary. In addition, chemical formulas of compounds and the like are representative, and the general names of the same compounds are not limited to the described valence.

Further, configuration, methods, processes, shapes, materials, numerical values and the like in the above-described embodiments, variations thereof, and examples may be combined insofar as they are not departing from the spirit of the present disclosure.

Moreover, even though the Embodiments and Examples described the examples in which the present disclosure is applied to cylindrical and laminate film-type secondary batteries, the battery is not particularly limited in terms of shape. For example, the present disclosure is also applicable to rectangular-shaped or coin-type secondary batteries and the like, and the present disclosure is also applicable to flexible batteries and the like for use on wearable terminals such as smart watches, head-mount displays, and iGlass (registered trademark).

Even though the Embodiments and Examples described the examples in which the present disclosure is applied to wound and laminate secondary batteries, the structure of the battery is not limited to these, and the present disclosure is also applicable to batteries in which a positive electrode and a negative electrode are folded with a separator therebetween and the like batteries, for example.

Moreover, even though the Embodiments and Examples described the examples in which the present disclosure is applied to the lithium ion secondary batteries and lithium ion polymer secondary batteries, the kinds of battery to which the present disclosure is applicable are not limited to these.

Moreover, even though the Embodiments and Examples described the examples in which the present disclosure is applied to the exemplary structures in which the electrode includes the collector and the active material layer, but the structure of the electrode is not limited to this. For example, the structure may be such that the electrode includes only the active material layer.

Furthermore, the positive electrode active material may further include at least one kind of lithium transition metal composite oxide other than lithium cobalt oxide and the lithium transition metal composite oxide in which cobalt in lithium cobalt oxide is replaced with a metal element other than cobalt.

In addition, the present disclosure is further described in detail according to an embodiment of the present disclosure.

(1)
A battery, including
a positive electrode including powder of a positive electrode active material;
a negative electrode; and
an electrolyte;
the powder including particles, which have a grain boundary and in which c axes of two regions sandwiching the grain boundary are in reflective symmetry, and
the powder including the particles by a content percentage of 500 or less.

(2)
The battery according to (1), in which the content percentage is 25% or less.

(3)
The battery according to (1) or (2), in which the positive electrode active material is a lithium transition metal composite oxide having a lamellar rock-salt-like structure.

(4)
The battery according to (3), in which the lithium transition metal composite oxide is at least one selected from the group consisting of lithium cobalt oxide and lithium transition metal composite oxides in which part of cobalt in lithium cobalt oxide is replaced with a metal element other than cobalt.

(5)
The battery according to (3), in which the lithium transition metal composite oxide has an average composition represented by the following Formula (1):

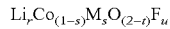

$$Li_rCo_{(1-s)}M_sO_{(2-t)}F_u \qquad (1)$$

where M is at least one selected from the group consisting of nickel, manganese, magnesium, aluminum, boron, titanium, vanadium, chrome, iron, copper, zinc, molybdenum, tin, calcium, strontium, and tungsten, and r, s, t, and u are values within such ranges that $0.8 \leq r \leq 1.2$, $0 \leq s < 0.5$, $-0.1 \leq t \leq 0.2$, and $0 \leq u \leq 0.1$, where lithium content in the composition varies depending on a charge and discharge state, and r indicates a value in a full discharge state.

(6)
The battery according to any one of (1) to (5), in which a potential of the positive electrode in a full charge state is 4.40 V or higher (vsLi/Li$^+$).

(7)
The battery according to any one of (1) to (6), in which an average particle diameter of the powder is not less than 2 µm but not more than 50 µm.

(8)
The battery according to any one of (1) to (7), further including an exterior housing member configured to accommodate the positive electrode, the negative electrode, and the electrolyte therein.

(9)
The battery according to (8), in which the exterior housing member is a laminate film.

(10)
A positive electrode active material, including: positive electrode active material particles, which have a grain boundary and in which c axes of two regions sandwiching the grain boundary are in reflective symmetry, and
the positive electrode active material including the positive electrode active material particles by a content percentage of 50% or less.

(11)
The positive electrode active material according to (10), for use in a lithium ion secondary battery or a lithium ion polymer secondary battery.

(12)
A positive electrode including the positive electrode active material according to (10) or (11).

(13)
A battery pack, including:
the battery according to any one of (1) to (9); and
a control unit configured to control charging and discharging of the battery.

(14)
An electronic device, including: the battery according to any one of (1) to (9),
the electronic device being configured to receive power from the battery.

(15)
An electric vehicle, including:
the battery according to any one of (1) to (9);
a converting device configured to receive power from the battery and convert the power into a driving force of the electric vehicle; and
a control device configured to perform information processing regarding vehicle control according to information regarding the battery.

(16)
A power storage device, including: the battery according to any one of (1) to (9),
the power storage device being configured to supply power to an electronic device connected to the battery.

(17)
The power storage device according to (16), including: a power information control device configured to transmit/receive signals to/from another device via a network,
charging and discharging of the battery are controlled according to information received by the power information control device.

(18)
A power system, including: the battery according to any one of (1) to (9), the power system being configured to receive power supplied from the battery.

(19)
The power system according to (18), in which power is supplied to the battery from a power generating device or a power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery, comprising
a positive electrode including powder of a positive electrode active material;
a negative electrode; and
an electrolyte;
wherein the positive electrode active material includes positive electrode active material particles, and
wherein the positive electrode active material particles include
a first particle that is a reflective symmetry particle and
a second particle that is a non-reflective symmetry particle, the second particle being different from the first particle,
wherein the first particle has a grain boundary, and c axes of two regions sandwiching the grain boundary are in reflective symmetry, and
wherein a content percentage of a plurality of the first particles in which the c axes of the two regions sandwiching the grain boundary are in the reflective symmetry and which have a particle diameter of 1 μm or greater, to a total number of the positive electrode active material particles having a particle diameter of 1 μm or greater in the positive electrode active material is 15% or less.

2. The battery according to claim 1, wherein the positive electrode active material includes a lithium transition metal composite oxide having a lamellar rock-salt-like structure.

3. The battery according to claim 2, wherein the lithium transition metal composite oxide includes at least one selected from the group consisting of lithium cobalt oxide and lithium transition metal composite oxides in which part of cobalt in lithium cobalt oxide is replaced with a metal element other than cobalt.

4. The battery according to claim 2, wherein the lithium transition metal composite oxide includes a composition represented by Formula (1):

$$Li_rCo_{(1-s)}M_sO_{(2-t)}F_u \qquad (1)$$

wherein M represents at least one selected from the group consisting of nickel, manganese, magnesium, aluminum, boron, titanium, vanadium, chrome, iron, copper, zinc, molybdenum, tin, calcium, strontium, tungsten, and combinations thereof, and r, s, t, and u represent values within such ranges that $0.8 \leq r \leq 1.2$, $0 \leq s < 0.5$, $-0.1 \leq t \leq 0.2$, and $0 \leq u \leq 0.1$ are satisfied, and wherein lithium content in the composition varies depending on a charge and discharge state, and r represents a value in a full discharge state.

5. The battery according to claim 1, wherein a potential of the positive electrode in a full charge state is 4.40 V or higher (vsLi/Li$^+$).

6. The battery according to claim 1, wherein an average particle diameter of the powder is from 2 μm to 50 μm.

7. The battery according to claim 1, further comprising an exterior housing member configured to accommodate the positive electrode, the negative electrode, and the electrolyte in the exterior housing member.

8. The battery according to claim 7, wherein the exterior housing member includes a laminate film.

9. A battery pack, comprising:
the battery according to claim 1; and
a charging and discharging circuit configured to control charging and discharging of the battery.

10. An electronic device, comprising: the battery according to claim 1,
wherein the electronic device is configured to receive power from the battery.

11. An electric vehicle, comprising:
the battery according to claim 1;
a converter configured to receive power from the battery and convert the power into a driving force of the electric vehicle; and
a processor configured to perform information processing regarding vehicle control according to information regarding the battery.

12. A power storage device, comprising: the battery according to claim 1,
wherein the power storage device is configured to supply power to an electronic device connected to the battery.

13. The power storage device according to claim 12, comprising: a central processing unit (CPU) configured to transmit/receive signals to/from another device via a network,
charging and discharging of the battery are controlled according to information received by the CPU.

14. A power system, comprising: the battery according to claim 1,
wherein the power system is configured to receive power supplied from the battery.

15. The power system according to claim 14, wherein power is configured to be supplied to the battery from a power generating device or a power network.

16. The battery according to claim 1, wherein the content percentage is 10% or less.

17. A positive electrode active material, comprising: positive electrode active material particles,
wherein the positive electrode active material particles include
a first particle that is a reflective symmetry particle and
a second particle that is a non-reflective symmetry particle, the second particle being different from the first particle,
wherein the first particle has a grain boundary, and c axes of two regions sandwiching the grain boundary are in reflective symmetry, and
wherein a content percentage of a plurality of the first particles in which the c axes of the two regions sandwiching the grain boundary are in the reflective symmetry and which have a particle diameter of 1 μm or greater, to a total number of the positive electrode active material particles having a particle diameter of 1 μm or greater in the positive electrode active material is 15% or less.

18. The positive electrode active material according to claim 17, wherein the positive electrode active material is configured to be used in a lithium ion secondary battery or a lithium ion polymer secondary battery.

19. A positive electrode comprising the positive electrode active material according to claim 17.

* * * * *